(12) United States Patent
Chono et al.

(10) Patent No.: US 9,288,485 B2
(45) Date of Patent: Mar. 15, 2016

(54) VIDEO IMAGE ENCODING AND DECODING DEVICE USING ADAPTIVE PSEUDO RANDOM NOISE INJECTION DURING PLANAR MODE FILTERING

(75) Inventors: Keiichi Chono, Tokyo (JP); Yuzo Senda, Tokyo (JP); Junji Tajime, Tokyo (JP); Hirofumi Aoki, Tokyo (JP); Kenta Senzaki, Toyko (JP)

(73) Assignee: NEC CORPORATION, Tokyo (JP)

( * ) Notice: Subject to any disclaimer, the term of this patent is extended or adjusted under 35 U.S.C. 154(b) by 466 days.

(21) Appl. No.: 13/810,586

(22) PCT Filed: Sep. 12, 2011

(86) PCT No.: PCT/JP2011/005121
§ 371 (c)(1),
(2), (4) Date: Jan. 16, 2013

(87) PCT Pub. No.: WO2012/035749
PCT Pub. Date: Mar. 22, 2012

(65) Prior Publication Data
US 2013/0121408 A1    May 16, 2013

(30) Foreign Application Priority Data

Sep. 17, 2010  (JP) ................................. 2010-208892

(51) Int. Cl.
*H04N 19/82* (2014.01)
*H04N 19/176* (2014.01)
(Continued)

(52) U.S. Cl.
CPC ....... *H04N 19/00018* (2013.01); *H04N 19/117* (2014.11); *H04N 19/159* (2014.11); *H04N 19/182* (2014.11); *H04N 19/80* (2014.11); *H04N 19/86* (2014.11)

(58) Field of Classification Search
USPC ........................................ 375/240.01–240.26
See application file for complete search history.

(56) References Cited

U.S. PATENT DOCUMENTS

2013/0121408 A1*   5/2013  Chono et al. ............. 375/240.03

FOREIGN PATENT DOCUMENTS

CN           101179720 A     5/2008

OTHER PUBLICATIONS

Davies (BBC) T et al: "Suggestion for a 1-6 Test Model", Davies (BBC) T et al: "Suggestion for a Test Model", 1. JCT-VC Meeting; Apr. 15, 2010-Apr. 23, 2010; Dresden; (Joint Collaborative Team on Video Coding of ISO/IEC JTC1/SC29/WG11 and ITU-TSG. 16 ).*

(Continued)

*Primary Examiner* — Dave Czekaj
*Assistant Examiner* — Alison Slater
(74) *Attorney, Agent, or Firm* — Sughrue Mion, PLLC

(57) ABSTRACT

When injecting pseudo random noise to an area centered on a block boundary, a video encoding device and a video decoding device prevent injection of pseudo random noise to an area including a reference image for subsequent planar mode filtering, in order to suppress linear artifacts. The video encoding device includes: an inverse quantization unit for inverse-quantizing a quantization index to obtain a quantization representative value; an inverse frequency transform unit for inverse-transforming the quantization representative value obtained by the inverse quantization unit, to obtain a reconstructed image block; and an adaptive distortion removal filter unit for injecting pseudo random noise to an area centered on a boundary of the reconstructed image block, wherein the adaptive distortion removal filter unit does not inject pseudo random noise to an area including a reference image for planar mode filtering.

6 Claims, 21 Drawing Sheets

(51) Int. Cl.
  *H04N 19/117* (2014.01)
  *H04N 19/103* (2014.01)
  *H04N 19/159* (2014.01)
  *H04N 19/182* (2014.01)
  *H04N 19/80* (2014.01)
  *H04N 19/86* (2014.01)

(56) References Cited

OTHER PUBLICATIONS

Chono K et al: "TE10: Conditional joint deblocking-debanding filter", Chono K et al: "TE10: Conditional joint deblocking-debanding filter", 3. JCT-VC Meeting; 94. MPEG MEETING; Oct. 7, 2010-Oct. 15, 2010; Guangzhou; (Joint Collaborative Team on Video Coding of ISO/IEC JTC1/SC29/WG11 and ITU-T SG.16).*

Chono K et al: "Description of video coding technology proposal by NEC Corporation", Apr. 15, 2010-Apr. 23, 2010; Joint Collaborative Team on Video Coding (JCT-VC) of ITU-T SG16 WP3 and ISO/IEC JTC1/SC29/WG11 1st Meeting: Dresden, DE, Apr. 15-23, 2010; Entire Document: JCTVC-A104.*

Chono K et al: "TE10: Conditional joint deblocking-debanding filter", 3. JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16).*

Keiichi Chono, et al., "Description of video coding technology proposal by NEC Corporation", Joint Collaborative Team on Video Coding (JCT-VC) of ITU-T SG16 WP3 and ISO/IEC JTC1/SC29/WG11, Apr. 16-23, 2010, pp. 1-18, Document: JCTVC-A104, $1^{st}$ Meeting: Dresden, DE.

Thomas Davies, et al., "Suggestion for a Test Model", Joint Collaborative Team on Video Coding (JCT-VC) of ITU-T SG16 WP3 and ISO/IEC JTC1/SC29/WG11, Apr. 16-23, 2010, pp. 1-6, 12-15, 19-21, Document: JCTVC-A033, $1^{st}$ Meeting: Dresden, DE.

Greg Conklin, et al., "Dithering 5-tap Filter for Inloop Deblocking", Joint Video Team (JVT) of ISO/IEC MPEG & ITU-T VCEG (ISO/IEC JTC1/SC29/WG11 and ITU-T SG16 Q.6), May 6-10, 2002, pp. 1-12, Document: JVT-0056, $3^{rd}$ Meeting: Fairfax, VA.

"Test Model under Consideration", Joint Collaboration Team on Video Coding (JCT-VC) of ITU-T SG16 WP3 and ISO/IEC JTC 1/SC29/WG11, Jul. 21-28, 2010, pp. 1-5, 100-110, 132-133, 140-142, Document: JCTVC-B205, $2^{nd}$ Meeting: Geneva, CH.

"Information technology-Coding of audio-visual objects-", International Standard, ISO/IEC 14496-10, May 15, 2009, pp. 1-694, Fifth Edition, Part 10: Advanced Video Coding.

Greg Conklin, et al., "Dithering 5-tap Filter for Inloop Deblocking", Joint Video Team (JVT) of ISO/IEC MPEG & ITU-T VCEG (ISO/IEC JTC1/SC29/WG11 and ITU-T SG16 Q.6), May 6-10, 2002, pp. 1-16, Document: JVT-0056.

"Test Model under Consideration", Joint Collaboration Team on Video Coding (JCT-VC) of ITU-T SG16 WP3 and ISO/IEC JTC 1/SC29/WG11, Jul. 21-28, 2010, pp. 1-153, Document: JCTVC-B205.

International Search Report of PCT/JP2011/005121 dated Dec. 6, 2011.

Extended European Search Report, dated Mar. 24, 2014, issued by the European Patent Office, in counterpart Application No. 11824765.9.

Chono, et al., "Description of video coding technology proposal by NEC Corporation", 1. JCT-VC Meeting; Apr. 15, 2010-Apr. 23, 2010; Dresden; (Joint Collaborative Team on Video Coding of ISO/IEC JTC1/SC29/WG11 and ITU-TSG.16); URL: http://WFTP3.ITU.INT/AV-ARCH/JCTVC-SITE/, No. XP030007532, Apr. 18, 2010, XP030007533, ISSN: 0000-0049.

Davies, et al., "Suggestion for a Test Model", 1. JCT-VC Meeting; Apr. 15, 2010-Apr. 23, 2010; Dresden; (Joint Collaborative Team on Video Coding of ISO/IEC JTC1/SC29/WG11 and ITU-TSG.16); URL: http://WFTP3.ITU.INT/AV-ARCH/JCTVC/-SITE/, May 7, 2010, XP030007526, ISSN: 0000-0049.

Chono, et al., "TE10: Conditional joint deblocking-debanding filter", 3. JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16); URL: http://WFTP3.ITU.INT/AV-ARCH/JCTVC-SITE/, No. JCTVC-C091, Oct. 1, 2010, XP030007798.

Chono, et al., "CE8: Conditional joint deblocking-debanding filter", 95. MPEG Meeting; Jan. 24, 2011-Jan. 28, 2011; Daegu; (Motion Picture Expert Group or ISO/IEC JTC1/SC29/WG11); No. m18790, Jan. 19, 2011, XP030047360.

Communication dated Jul. 27, 2015 from the State Intellectual Property Office of the People's Republic of China in counterpart application No. 201180044746.7.

* cited by examiner

FIG. 3
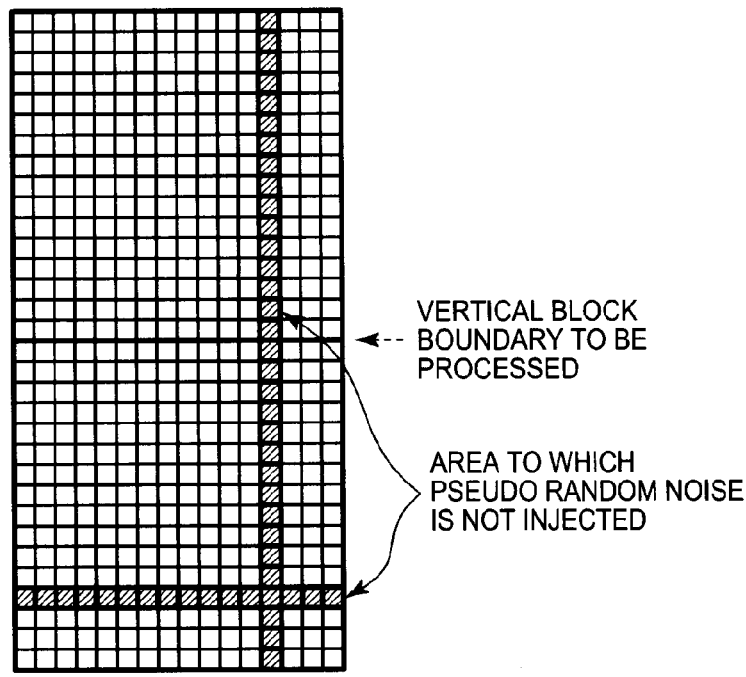
VERTICAL BLOCK BOUNDARY TO BE PROCESSED
AREA TO WHICH PSEUDO RANDOM NOISE IS NOT INJECTED
FIG. 4
RELATED ART
Depth=0, N=64
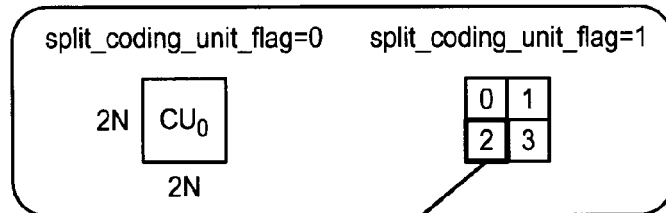
Depth=1, N=32
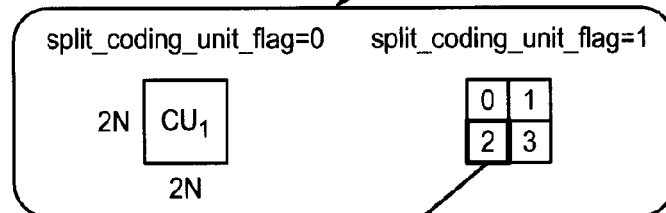
⋮
Depth=4, N=4
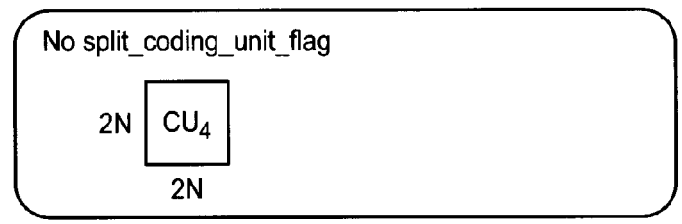

▨ : REFERENCE IMAGE

▨ : BOTTOM RIGHT IMAGE

▨ : REFERENCE IMAGE

▨ : BOTTOM RIGHT IMAGE

▨ : ONE-DIMENSIONAL LINEAR INTERPOLATED IMAGE

▨ : REFERENCE IMAGE

▨ : BOTTOM RIGHT IMAGE

▨ : ONE-DIMENSIONAL LINEAR INTERPOLATED IMAGE

▨ : TWO-DIMENSIONAL LINEAR INTERPOLATED IMAGE

16 × 16 Planar mode blocks

BLOCK BOUNDARY TO BE PROCESSED

☒ : BASIC IMAGE

☐ : PLANAR MODE FILTERED IMAGE

BLOCK BOUNDARY TO BE PROCESSED

VIDEO IMAGE ENCODING AND DECODING DEVICE USING ADAPTIVE PSEUDO RANDOM NOISE INJECTION DURING PLANAR MODE FILTERING

CROSS REFERENCE TO RELATED APPLICATIONS

This application is a National Stage of International Application No. PCT/JP2011/005121 filed Sep. 12, 2011, claiming priority based on Japanese Patent Application No. 2010-208892, filed Sep. 17, 2010, the contents of all of which are incorporated herein by reference in their entirety.

TECHNICAL FIELD

The present invention relates to a video encoding device and a video decoding device to which video encoding technology is applied.

BACKGROUND ART

Typically, after digitizing a video signal input from outside, a video encoding device performs an encoding process conforming to a predetermined video encoding scheme, to create encoded data, i.e. a bitstream.

As the predetermined video encoding scheme, ISO/IEC 14496-10 Advanced Video Coding (AVC) described in Non Patent Literature (NPL) 1 is available. As a reference model of an AVC encoder, a Joint Model scheme is known (hereafter referred to as a typical video encoding device).

A structure and an operation of the typical video encoding device which receives each frame of digitized video as input and outputs a bitstream are described below, with reference to FIG. 20.

As shown in FIG. 20, the typical video encoding device includes an MB buffer 101, a frequency transform unit 102, a quantization unit 103, an entropy encoder 104, an inverse quantization unit 105, an inverse frequency transform unit 106, a picture buffer 107, a distortion removal filter unit 108a, a decode picture buffer 109, an intra prediction unit 110, an inter-frame prediction unit 111, an encoding control unit 112, and a switch 100.

The typical video encoding device divides each frame into blocks of 16×16 pixels in size called macroblocks (MBs), and further divides each MB into blocks of 4×4 pixels in size, where each 4×4 block obtained as a result of the division is a minimum unit of encoding.

FIG. 21 is an explanatory diagram showing an example of block division in the case where each frame has a spatial resolution of QCIF (Quarter Common Intermediate Format). The following describes an operation of each unit shown in FIG. 20 by focusing only on pixel values of luminance, for simplicity's sake.

The MB buffer 101 stores pixel values of an MB to be encoded in an input image frame. The MB to be encoded is hereafter referred to as an input MB.

A prediction signal supplied from the intra prediction unit 110 or the inter-frame prediction unit 111 via the switch 100 is subtracted from the input MB supplied from the MB buffer 101. The input MB from which the prediction signal has been subtracted is hereafter referred to as a prediction error image block.

The intra prediction unit 110 creates an intra prediction signal, using a reconstructed image that is stored in the picture buffer 107 and has the same display time as the current frame. An MB encoded using the intra prediction signal is hereafter referred to as an intra MB.

The inter-frame prediction unit 111 creates an inter-frame prediction signal, using a reference image that is stored in the decode picture buffer 109 and has a different display time from the current frame. An MB encoded using the inter-frame prediction signal is hereafter referred to as an inter MB.

A frame encoded including only intra MBs is called an I frame. A frame encoded including not only intra MBs but also inter MBs is called a P frame. A frame encoded including inter MBs for which not only one reference image but two reference images are simultaneously used for inter-frame prediction signal creation is called a B frame.

The encoding control unit 112 compares each of the intra prediction signal and the inter-frame prediction signal with the input MB stored in the MB buffer 101, selects a prediction signal corresponding to smaller energy of the prediction error image block, and controls the switch 100 accordingly. Information about the selected prediction signal (intra prediction mode, intra prediction direction, and inter-frame prediction-related information) is supplied to the entropy encoder 104.

The encoding control unit 112 also selects a basis block size of integer DCT (Discrete Cosine Transform) suitable for frequency transform of the prediction error image block, based on the input MB or the prediction error image block. The integer DCT means frequency transform by a basis obtained by approximating a DCT basis by an integer in the typical video encoding device. The basis block size is selectable from three block sizes that are 16×16, 8×8, and 4×4. A larger basis block size is selected when the input MB or the prediction error image block has flatter pixel values. Information about the selected integer DCT basis size is supplied to the frequency transform unit 102 and the entropy encoder 104. The information about the selected prediction signal, the information about the selected integer DCT basis size and the like, and a quantization parameter described later are hereafter referred to as auxiliary information.

The encoding control unit 112 further monitors the number of bits of a bitstream output from the entropy encoder 104, in order to encode the frame with not more than a target number of bits. The encoding control unit 112 outputs a quantization parameter for increasing a quantization step size if the number of bits of the output bitstream is more than the target number of bits, and outputs a quantization parameter for decreasing the quantization step size if the number of bits of the output bitstream is less than the target number of bits. Encoding is thus performed so that the output bitstream approaches the target number of bits.

The frequency transform unit 102 frequency-transforms the prediction error image block with the selected integer DCT basis size, from a spatial domain to a frequency domain. The prediction error transformed to the frequency domain is referred to as a transform coefficient.

The quantization unit 103 quantizes the transform coefficient with the quantization step size corresponding to the quantization parameter supplied from the encoding control unit 112. A quantization index of the quantized transform coefficient is also called a level.

The entropy encoder 104 entropy-encodes the auxiliary information and the quantization index, and outputs the resulting sequence of bits, i.e. the bitstream.

The inverse quantization unit 105 and the inverse frequency transform unit 106 inverse-quantizes the quantization index supplied from the quantization unit 103 to obtain a quantization representative value and further inverse-frequency-transforms the quantization representative value to return it to the original spatial domain, for subsequent encoding. The prediction error image block returned to the original spatial domain is hereafter referred to as a reconstructed prediction error image block.

The picture buffer 107 stores a reconstructed image block obtained by adding the prediction signal to the reconstructed prediction error image block, until all MBs included in the current frame are encoded. A picture composed of a reconstructed image in the picture buffer 107 is hereafter referred to as a reconstructed image picture.

The distortion removal filter unit 108a applies filtering to boundaries of each MB of the reconstructed image and internal blocks of the MB, thereby performing a process of removing distortions (block distortions and banding distortions) for the reconstructed image stored in the picture buffer 107.

FIGS. 22 and 23 are each an explanatory diagram for describing the operation of the distortion removal filter unit 108a.

The distortion removal filter unit 108a applies filtering to horizontal block boundaries of the MB and internal blocks of the MB, as shown in FIG. 22. The distortion removal filter unit 108a also applies filtering to vertical block boundaries of the MB and internal blocks of the MB, as shown in FIG. 23. The horizontal block boundaries are left block boundaries of 4×4 blocks 0, 4, 8, and 12, left block boundaries of 4×4 blocks 1, 5, 9, and 13, left block boundaries of 4×4 blocks 2, 6, 10, and 14, and left block boundaries of 4×4 blocks 3, 7, 11, and 15. The vertical block boundaries are upper block boundaries of 4×4 blocks 0, 1, 2, and 3, upper block boundaries of 4×4 blocks 4, 5, 6, and 7, upper block boundaries of 4×4 blocks 8, 9, 10, and 11, and upper block boundaries of 4×4 blocks 12, 13, 14, and 15.

Note that, in the case where the integer DCT of 8×8 block size is used for the MB, only the left block boundaries of the 4×4 blocks 0, 4, 8, and 12, the left block boundaries of the 4×4 blocks 2, 6, 10, and 14, the upper block boundaries of the 4×4 blocks 0, 1, 2, and 3, and the upper block boundaries of the 4×4 blocks 8, 9, 10, and 11 are block boundaries subjected to distortion removal. In the case where the basis of the integer DCT of 16×16 block size is a basis obtained by approximating the basis of the DCT of 16×16 block size by an integer and the integer DOT of 16×16 block size is used for the MB, only the left block boundaries of the 4×4 blocks 0, 4, 8, and 12 and the upper block boundaries of the 4×4 blocks 0, 1, 2, and 3 are block boundaries subjected to distortion removal.

Regarding the filtering process for each horizontal block boundary, pre-filtering pixels on the left side of the block boundary are denoted by p3, p2, p1, and p0, post-filtering pixels on the left side of the block boundary by P3, P2, P1, and P0, pre-filtering pixels on the right side of the block boundary by q0, q1, q2, and q3, and post-filtering pixels on the right side of the block boundary by Q0, Q1, Q2, and Q3.

Regarding the filtering process for each vertical block boundary, pre-filtering pixels on the upper side of the block boundary are denoted by p3, p2, p1, and p0, post-filtering pixels on the upper side of the block boundary by P3, P2, P1, and P0, pre-filtering pixels on the lower side of the block boundary by q0, q1, q2, and q3, and post-filtering pixels on the lower side of the block boundary by Q0, Q1, Q2, and Q3.

It is assumed that P3, P2, P1, P0, Q0, Q1, Q2, and Q3 are initialized respectively to p3, p2, p1, p0, q0, q1, q2, and q3.

The filtering process for the block boundary is the same between the horizontal direction and the vertical direction. Accordingly, the following description of the filtering process for the block boundary is made without particularly distinguishing between the horizontal direction and the vertical direction. FIG. 24 shows an internal structure of the distortion removal filter unit 108a.

In the distortion removal filter unit 108a shown in FIG. 24, first a block boundary strength determination unit 1081 determines a block boundary strength bS (0≤bS≤4) based on auxiliary information of an adjacent block, with reference to 8.7 Deblocking filter process in NPL 1. FIG. 25 is a flowchart showing a process of determining bS.

In the case where any of the pixel p0 and the pixel q0 at the block boundary is a pixel of an intra MB (step S101), the block boundary strength determination unit 1081 determines whether or not the pixel p0 and the pixel q0 are pixels on both sides of an MB boundary (step S102). In the case where the pixel p0 and the pixel q0 are the pixels on both sides of the MB boundary, the block boundary strength determination unit 1081 determines bS as 4. In the case where the pixel p0 and the pixel q0 are not the pixels on both sides of the MB boundary, the block boundary strength determination unit 1081 determines bS as 3.

In the case where none of the pixel p0 and the pixel q0 is a pixel of an intra MB, the block boundary strength determination unit 1081 determines whether or not a quantization index is present in any of blocks to which the pixel p0 and the pixel q0 respectively belong (step S103). In the case where the quantization index is present in any of the blocks to which the pixel p0 and the pixel q0 respectively belong, the block boundary strength determination unit 1081 determines bS as 2. In the case where the quantization index is not present in any of the blocks to which the pixel p0 and the pixel q0 respectively belong, the block boundary strength determination unit 1081 determines whether or not inter-frame prediction is discontinuous between the pixel p0 and the pixel q0 (step S104). In the case where the inter-frame prediction is discontinuous, the block boundary strength determination unit 1081 determines bS as 1. In the case where the inter-frame prediction is not discontinuous, the block boundary strength determination unit 1081 determines bS as 0.

The process of determining bS is described in more detail in 8.7.2 Filtering process for a set of samples across a horizontal or vertical block edge in NPL 1.

When bS is larger, it is determined that the block boundary has a larger amount of change, and stronger filtering is applied. No filtering is applied when bS=0.

The following describes a filtering process using pseudo random noise in NPL 2 based on NPL 1 for a block boundary limited to bS>0, separately for the case where bS=4 and the case where bS<4.

In the case where bS=4, for each edge of pos (0≤pos≤16) of a row (in horizontal filtering) or a column (in vertical filtering) of the block boundary to be processed, an edge determination unit 1082 determines an edge where $|p0-q0|<\alpha/4$ and $|p1-p0|<\beta$, as an edge to be filtered. A filter unit 1083 calculates P0, P1, and P2 by the following equations that use pseudo random noise ditherP[pos] (1≤ditherP[pos]≤7) corresponding to pos.

$$P0=(p2+2*p1+2*p0+2*q0+q1+ditherP[pos])/8 \quad (1)$$

$$P1=(p3+2*p2+2*p1+2*p0+q0+ditherP[pos])/8 \quad (2)$$

$$P2=(2*p3+3*p2+p1+p0+q0+ditherP[pos])/8 \quad (3)$$

Here, α and β are each a parameter that is larger when a quantization parameter Q is larger, and pos is a position corresponding to coordinates of the block position to be processed.

Likewise, in the case where bS=4, for each edge of pos (0≤pos≤16) of a row (in horizontal filtering) or a column (in vertical filtering) of the block boundary to be processed, the edge determination unit 1082 determines an edge where |p0−q0|<α/4 and |q1−q0|<β, as an edge to be filtered. The filter unit 1083 calculates Q0, Q1, and Q2 by the following equations that use pseudo random noise ditherQ[pos] (1≤ditherQ[pos]≤7) corresponding to pos.

$$Q0=(q2+2*q1+2*q0+2*p0+p1+ditherQ[pos])/8 \quad (4)$$

$$Q1=(q3+2*q2+2*q1+2*q0+p0+ditherQ[pos])/8 \quad (5)$$

$$Q2=(2*q3+3*q2+q1+q0+p0+ditherQ[pos])/8 \quad (6)$$

By injecting pseudo random noise to the block boundary as shown by Equations (1) to (6), not only block distortions are removed but also banding distortions are made visually unnoticeable.

In the case where bS<4, for each edge of pos (0≤pos≤16) of a row (in horizontal filtering) or a column (in vertical filtering) of the block boundary to be processed, the edge determination unit 1082 determines an edge where |p0−p2|<β, as an edge to be filtered. The filter unit 1083 calculates P0 by the following equation.

$$P0=p0+Clip3\{-tc,tc,(2*(q0-p0)+p1-q1+4)/8\} \quad (7)$$

Here, tc is a parameter that is larger when bS and the quantization parameter Q are larger.

Likewise, in the case where bS<4, for each edge of pos (0≤pos≤16) of a row (in horizontal filtering) or a column (in vertical filtering) of the block boundary to be processed, the edge determination unit 1082 determines an edge where |q0−q2|<β, as an edge to be filtered. The filter unit 1083 calculates Q0 by the following equation.

$$Q0=q0-Clip3\{-tc,tc,(2*(q0-p0)+p1-q1+4)/8\} \quad (8)$$

The decode picture buffer 109 stores a distortion-removed reconstructed image picture supplied from the distortion removal filter unit 108a, from which block distortions and ringing distortions have been removed, as a reference image picture. An image of the reference image picture is used as a reference image for creating the inter-frame prediction signal.

The video encoding device shown in FIG. 20 creates the bitstream through the processing described above.

CITATION LIST

Non Patent Literature(s)

NPL 1: ISO/IEC 14496-10 Advanced Video Coding
NPL 2: G. Conklin and N. Gokhale, "Dithering 5-tap Filter for Inloop Deblocking", Joint Video Team (JVT) of ISO/IEC MPEG & ITU-T VCEG, JVT-C056, May, 2002
NPL 3: "Test Model under Consideration", Document: JCTVC-B205, Joint Collaborative Team on Video Coding (JCT-VC) of ITU-T SG16 WP3 and ISO/IEC JTC1/SC29/WG11 2nd Meeting: Geneva, CH, 21-28 Jul., 2010

SUMMARY OF INVENTION

Technical Problem

Intra prediction of a new concept called planar prediction is introduced in Test Model under Consideration (TMuC scheme) in NPL 3, with reference to Section 5.1.1.3.1 Specification of intra planar prediction. In planar prediction, first a bottom right image of a block to be encoded is transmitted from an encoder based on prediction encoding using a reference image (see FIG. 26). In planar prediction, a prediction image of a rightmost column and a bottom row of the block to be encoded is then calculated by one-dimensional linear interpolation, using the transmitted bottom right image and a peripheral reference image of the block to be encoded (see FIG. 27). Lastly, a prediction image of the remaining area is calculated by two-dimensional linear interpolation (see FIG. 28).

No prediction error (difference between original signal and interpolated image) is transmitted for a block for which planar prediction (hereafter also referred to as a planar mode) is used. That is, the interpolated image itself serves as a reconstructed image. Hence, for adjacent planar mode block boundaries, a process different from the distortion removal described in the Background Art section is described in Planar mode filtering in Section 5.4.1 Deblocking filter process in NPL 3. In planar mode filtering, one-dimensional linear interpolation is performed on a block boundary of adjacent planar mode blocks (see FIG. 29), using an image of a predetermined position on both sides of the block boundary (see FIG. 30). For the horizontal block boundary, the image of the predetermined position includes the M/4-th image on the left side of the block boundary and the M/4-th image on the right side of the block boundary. For the vertical block boundary, the image of the predetermined position includes the M/4-th image on the upper side of the block boundary and the M/4-th image on the lower side of the block boundary. Hereafter, the image of the predetermined position is referred to as a basic image, and a distortion-removed image obtained by one-dimensional interpolation using the reference image is referred to as a planar mode filtered image.

The planar mode filtered image is calculated by one-dimensional interpolation using the basic image. Accordingly, there is a problem that, when pseudo random noise is injected to the area centered on the block boundary by the typical distortion removal technique, pseudo random noise injected to the basic image diffuses in the horizontal and vertical directions by one-dimensional interpolation, causing artifacts linearly (linear artifacts).

The present invention has an object of, when injecting pseudo random noise to an area centered on a block boundary, preventing injection of pseudo random noise to an area including a basic image for subsequent planar mode filtering, in order to suppress the above-mentioned linear artifacts.

Solution to Problem

A video encoding device according to the present invention includes: inverse quantization means for inverse-quantizing a quantization index to obtain a quantization representative value; inverse frequency transform means for inverse-transforming the quantization representative value obtained by the inverse quantization means, to obtain a reconstructed image block; and noise injection means for injecting pseudo random noise to an area centered on a boundary of the reconstructed image block, wherein the noise injection means does not inject pseudo random noise to an area including a basic image for planar mode filtering.

A video decoding device according to the present invention includes: inverse quantization means for inverse-quantizing a quantization index to obtain a quantization representative value; inverse frequency transform means for inverse-transforming the quantization representative value obtained by the inverse quantization means, to obtain a reconstructed image block; and noise injection means for injecting pseudo random noise to an area centered on a boundary of the reconstructed image block, wherein the noise injection means does not inject pseudo random noise to an area including a basic image for planar mode filtering.

A video encoding method according to the present invention includes: inverse-quantizing a quantization index to obtain a quantization representative value; inverse-transforming the obtained quantization representative value to obtain a reconstructed image block; and injecting pseudo random noise to an area centered on a boundary of the reconstructed image block, wherein, in the process of injecting pseudo random noise, pseudo random noise is not injected to an area including a basic image for planar mode filtering.

A video decoding method according to the present invention includes: inverse-quantizing a quantization index to obtain a quantization representative value; inverse-transforming the obtained quantization representative value to obtain a reconstructed image block; and injecting pseudo random noise to an area centered on a boundary of the reconstructed image block, wherein, in the process of injecting pseudo random noise, pseudo random noise is not injected to an area including a basic image for planar mode filtering.

A video encoding program according to the present invention causes a computer to execute: a process of inverse-quantizing a quantization index to obtain a quantization representative value; a process of inverse-transforming the obtained quantization representative value to obtain a reconstructed image block; and a process of injecting pseudo random noise to an area centered on a boundary of the reconstructed image block, except an area including a basic image for planar mode filtering.

A video decoding program according to the present invention causes a computer to execute: a process of inverse-quantizing a quantization index to obtain a quantization representative value; a process of inverse-transforming the obtained quantization representative value to obtain a reconstructed image block; and a process of injecting pseudo random noise to an area centered on a boundary of the reconstructed image block, except an area including a basic image for planar mode filtering.

Advantageous Effects of Invention

The video encoding device and the video decoding device according to the present invention include means for detecting an area including a reference image for planar mode filtering based on block auxiliary information and a distortion removal edge position, and thereby preventing injection of pseudo random noise to the reference image for planar mode filtering. Thus, the video encoding device and the video decoding device capable of suppressing linear artifacts while suppressing banding distortions can be provided.

BRIEF DESCRIPTION OF DRAWINGS

FIG. 3 is an explanatory diagram showing an area to which pseudo random noise is not injected in vertical block boundary distortion removal.

FIG. 4 is an explanatory diagram for describing a CTB.

DESCRIPTION OF EMBODIMENTS

Figure 1:
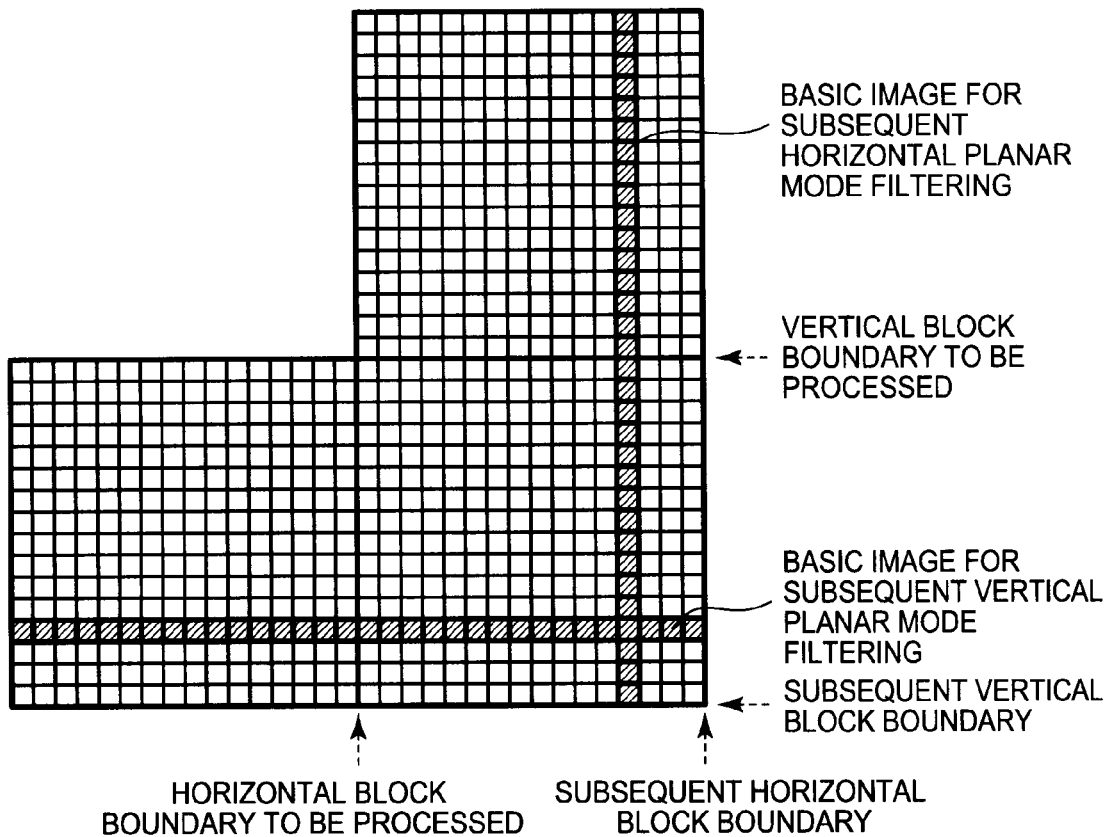
FIG. 1 is an explanatory diagram showing horizontal and vertical block boundaries to be processed, subsequent horizontal and vertical block boundaries, and reference images for planar mode filtering of the subsequent horizontal and vertical block boundaries.

FIG. 1 is an explanatory diagram showing horizontal and vertical block boundaries to be processed, subsequent horizontal and vertical block boundaries, and reference images for planar mode filtering of the subsequent horizontal and vertical block boundaries.

Figure 2:
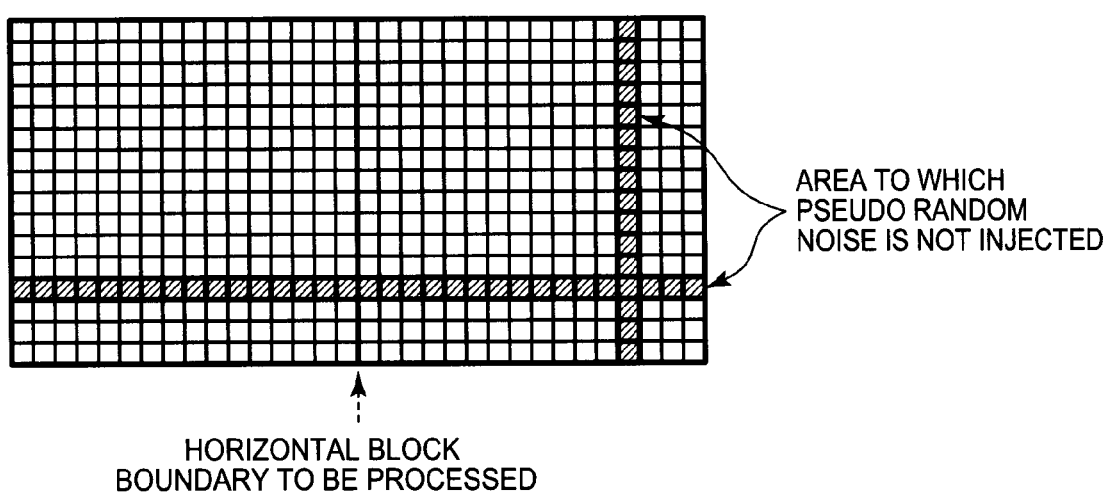
FIG. 2 is an explanatory diagram showing an area to which pseudo random noise is not injected in horizontal block boundary distortion removal.

As shown in FIG. 1, when one block is M in width, in a horizontal block boundary to be processed, the (M−M/4)-th row is a reference image for planar mode filtering of a subsequent vertical block boundary, and the (M−M/4)-th column is a reference image for planar mode filtering of a subsequent horizontal block boundary. In detail, FIG. 2 shows an area to which pseudo random noise is not injected in distortion removal of a horizontal block boundary.

As shown in FIG. 1, when one block is M in width, in a vertical block boundary to be processed, the (M−M/4)-th column is a reference image for planar mode filtering of a subsequent horizontal block boundary, and the (M−M/4)-th row is a reference image for planar mode filtering of a subsequent vertical block boundary. In detail, FIG. 3 shows an area to which pseudo random noise is not injected in distortion removal of a vertical block boundary.

In the present invention, a video encoding device and a video decoding device detect an area to which pseudo random noise is not injected in distortion removal of a block boundary, based on block auxiliary information and a distortion removal edge position. The distortion removal edge position is a row number of the block boundary in distortion removal of a horizontal block boundary, and a column number of the block boundary in distortion removal of a vertical block boundary.

In the present invention, in the case where the above-mentioned row number or column number is a row number or column number of a reference image for planar mode filtering of subsequent horizontal and vertical block boundaries, the video encoding device and the video decoding device do not inject pseudo random noise to an image of the row number or column number.

Moreover, in the present invention, in the case where the block to be processed is in the planar mode, the video encoding device and the video decoding device use the planar mode block size to limit the pseudo random noise injection range so that pseudo random noise is not injected to the reference image for planar mode filtering of subsequent horizontal and vertical block boundaries.

Exemplary Embodiment 1

This exemplary embodiment describes a video encoding device using an adaptive distortion removal filter for detecting an area to which pseudo random noise is not injected in distortion removal of a block boundary based on block auxiliary information and a distortion removal edge position, and adaptively injecting pseudo random noise.

In this exemplary embodiment, not the JM scheme but the TMuC scheme is employed as the video encoding scheme. Main differences between the JM scheme and the TMuC scheme lie in: whether or not the planar mode is available; and a concept corresponding to the MB. Referring to Section 7 Unit definition in NPL 3, in the TMuC scheme, a concept corresponding to the MB is a coding tree block (CTB), which is not fixed to 16×16 but is variable in a range from 128×128 to 8×8 (see FIG. 4). A maximum coding tree block is referred to as a largest coding tree block (LCTB), and a minimum coding tree block is referred to as a smallest coding tree block (SCTB). In this Description, a block corresponding to the CTB is referred to as a coding unit (CU).

Figure 5:
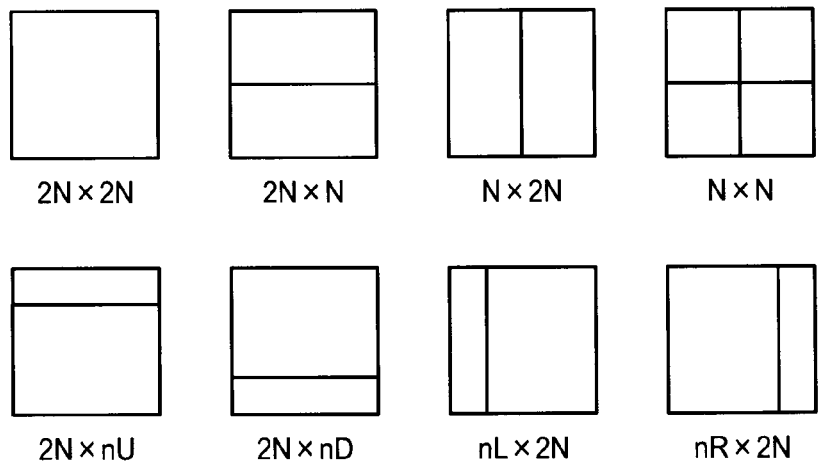
FIG. 5 is an explanatory diagram for describing a PU.
Figure 6:
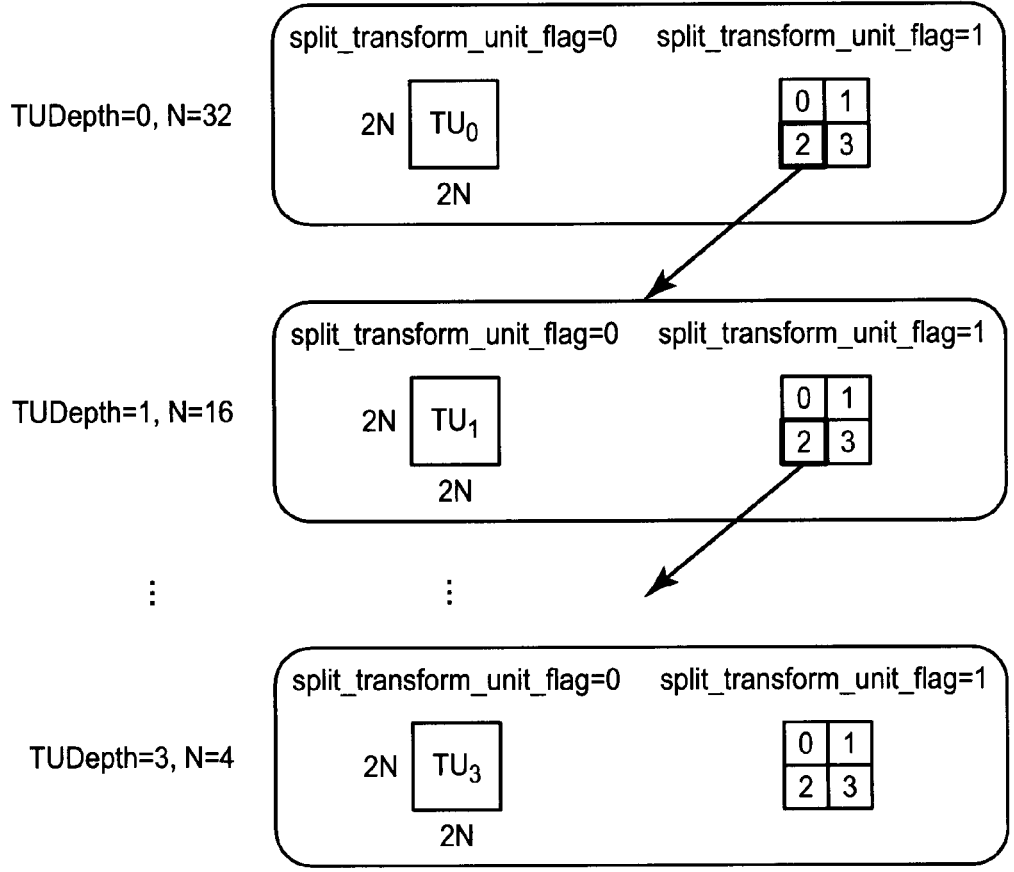
FIG. 6 is an explanatory diagram for describing a TU.

Furthermore, a concept of a prediction unit (PU) as a unit of prediction mode for the coding tree block (see FIG. 5) and a concept of a transform unit (TU) as a unit of frequency transform for the coding tree block (see FIG. 6) are introduced in the TMuC scheme. The TU is variable in a range from 64×64 to 4×4. Note that only the squares from among the shapes shown in the explanatory diagram of FIG. 5 are supported in the intra prediction mode.

Figure 7:
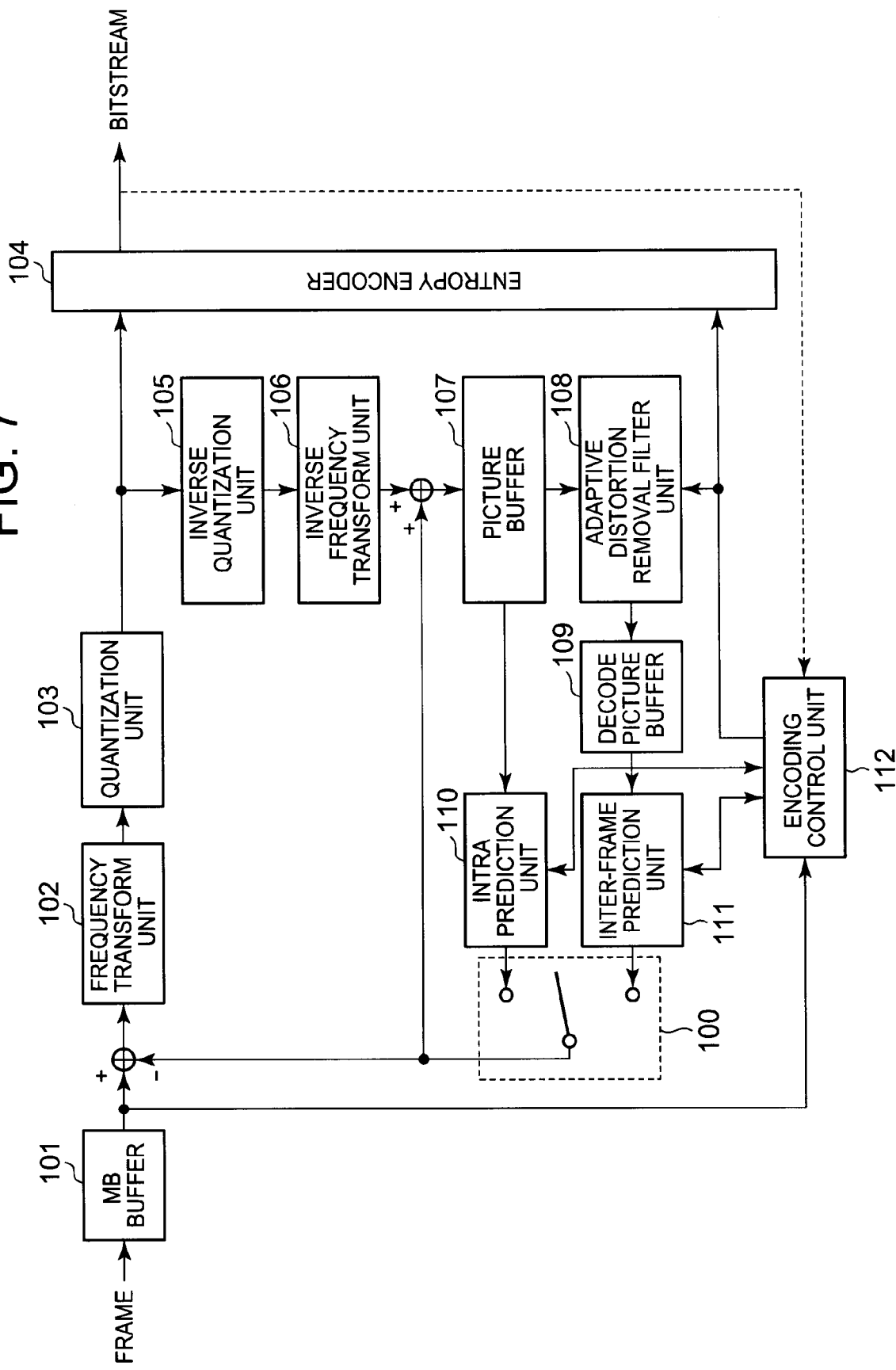
FIG. 7 is a block diagram showing a structure of a video encoding device in Exemplary Embodiment 1.
Figure 20:
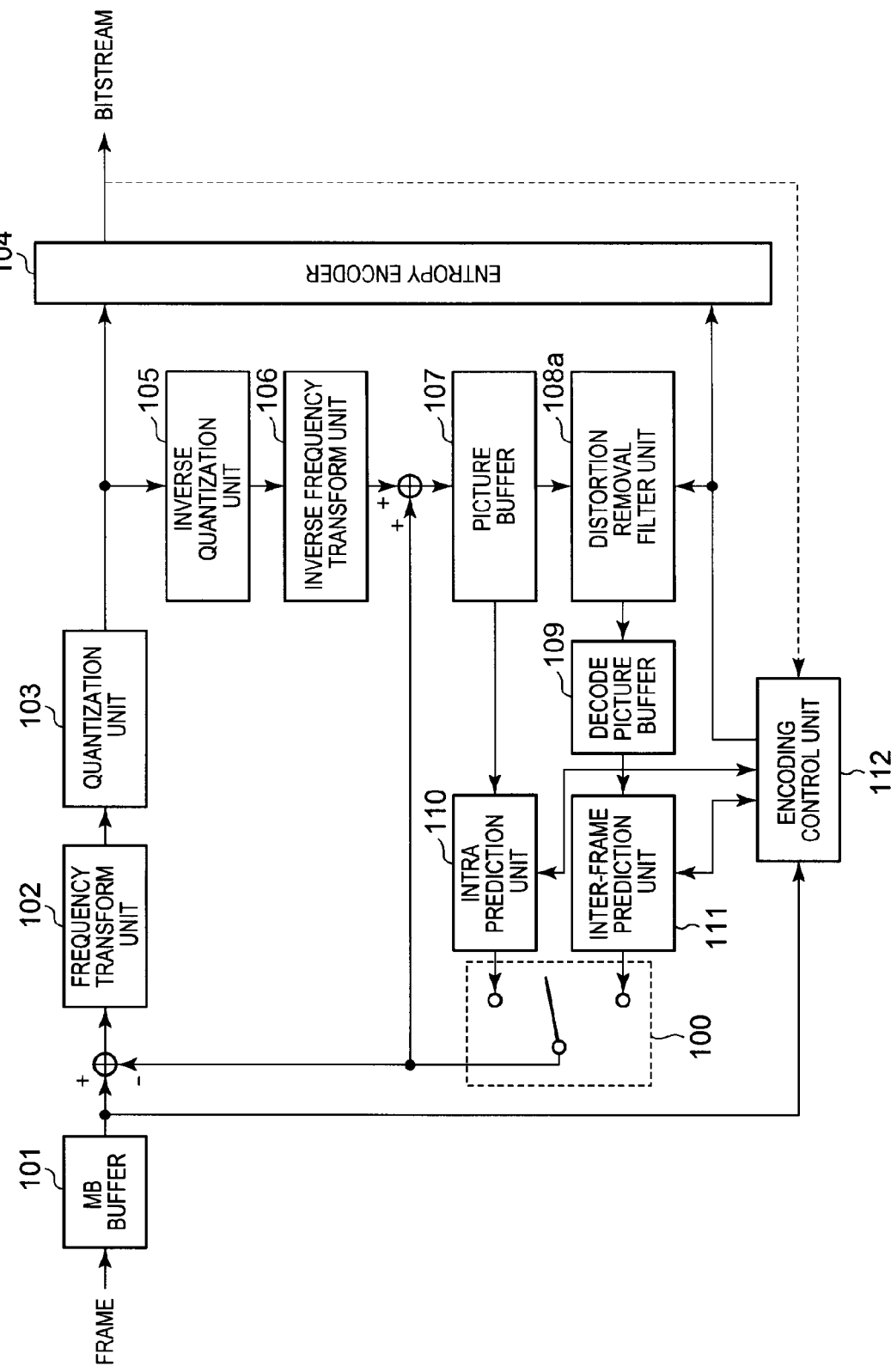
FIG. 20 is a block diagram showing a structure of a typical video encoding device.
Figure 21:
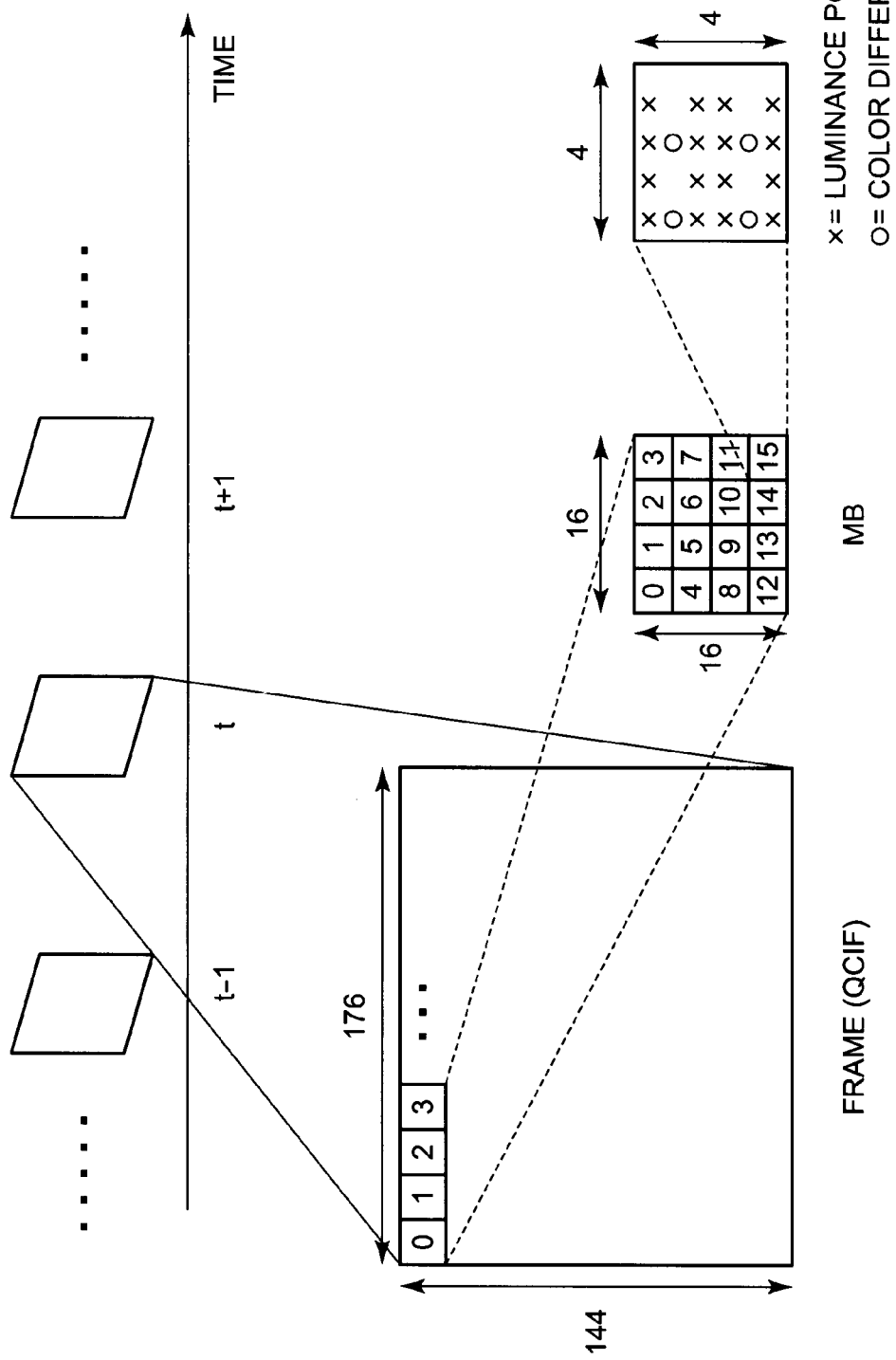
FIG. 21 is an explanatory diagram showing an example of block division.
Figure 22:
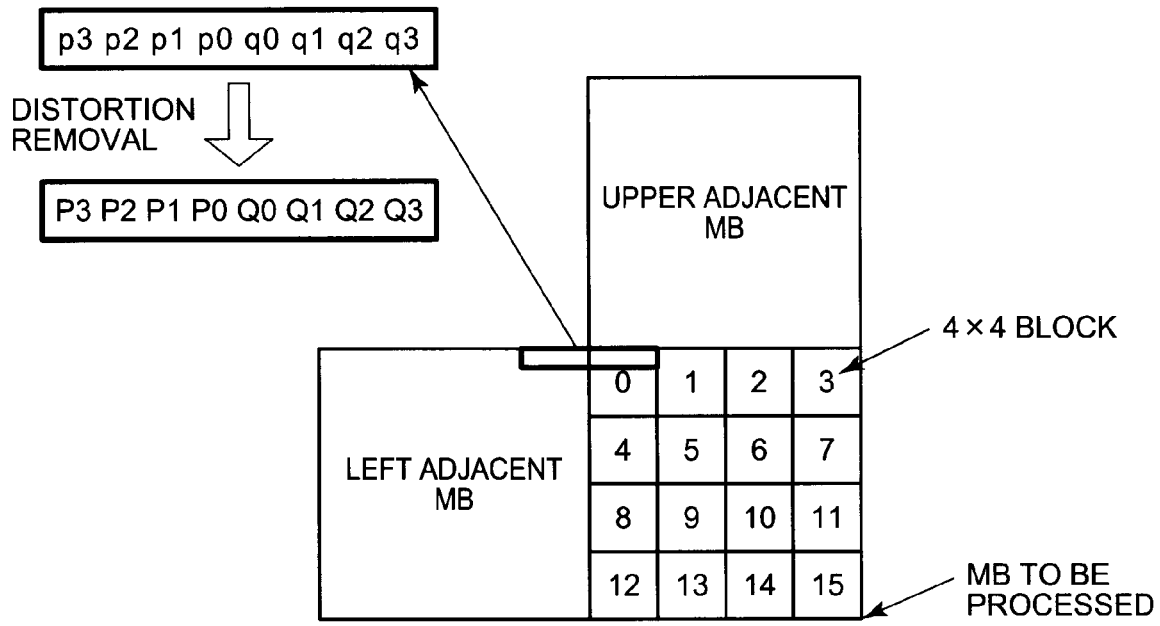
FIG. 22 is an explanatory diagram for describing application of horizontal filtering of a distortion removal filter.
Figure 23:
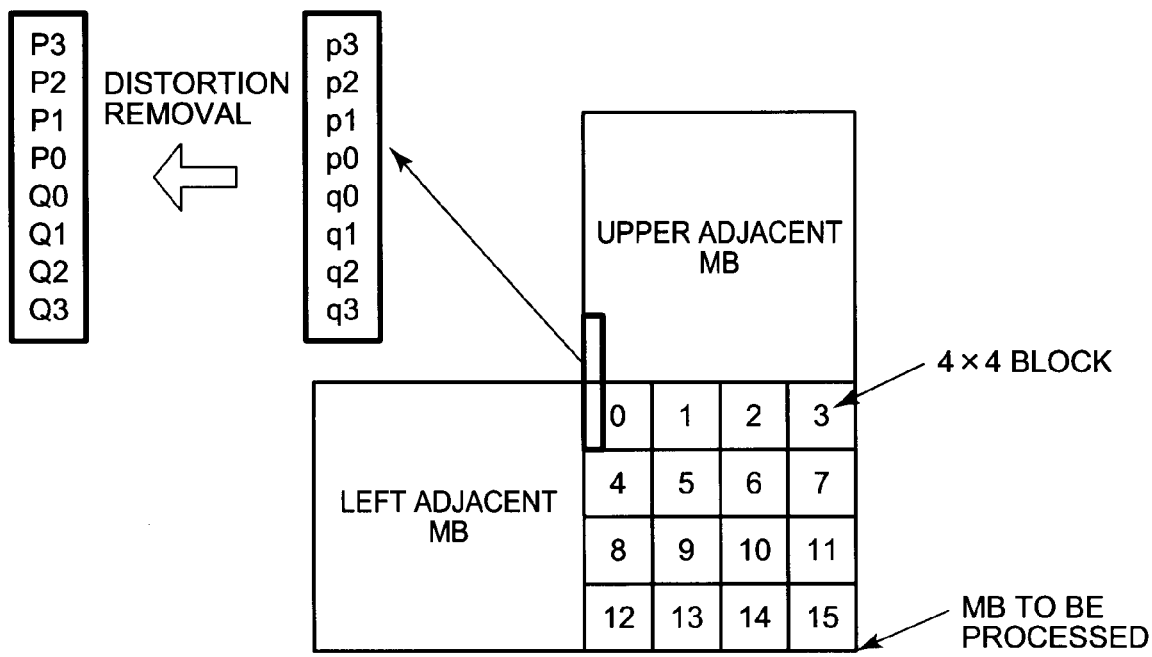
FIG. 23 is an explanatory diagram for describing application of vertical filtering of a distortion removal filter.

The video encoding device in this exemplary embodiment shown in FIG. 7 includes an adaptive distortion removal filter 108 in place of the distortion removal filter 108a, when compared with the typical video encoding device shown in FIG. 20. A structure and an operation of the adaptive distortion removal filter 108 as an example of noise injection means which is a feature of the present invention are described below. Though intra prediction of the new concept called planar prediction is introduced in the TMuC scheme, the structure of the video encoding device is hardly different because, for each planar mode block, merely a prediction error image block composed of zero pixels needs to be input to the frequency transform unit 102.

Figure 8:
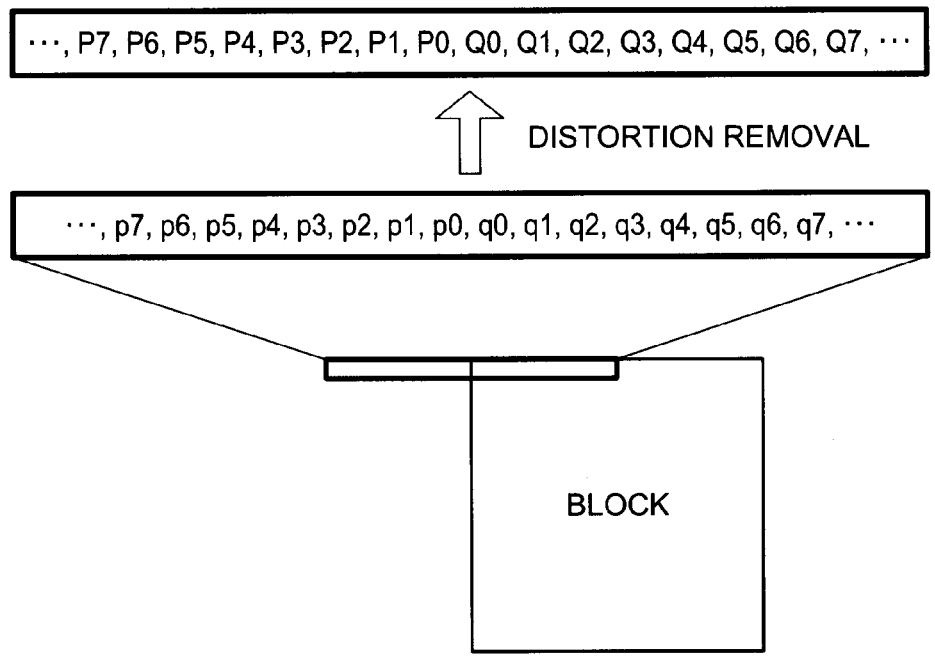
FIG. 8 is an explanatory diagram for describing application of horizontal filtering of an adaptive distortion removal filter.
Figure 9:
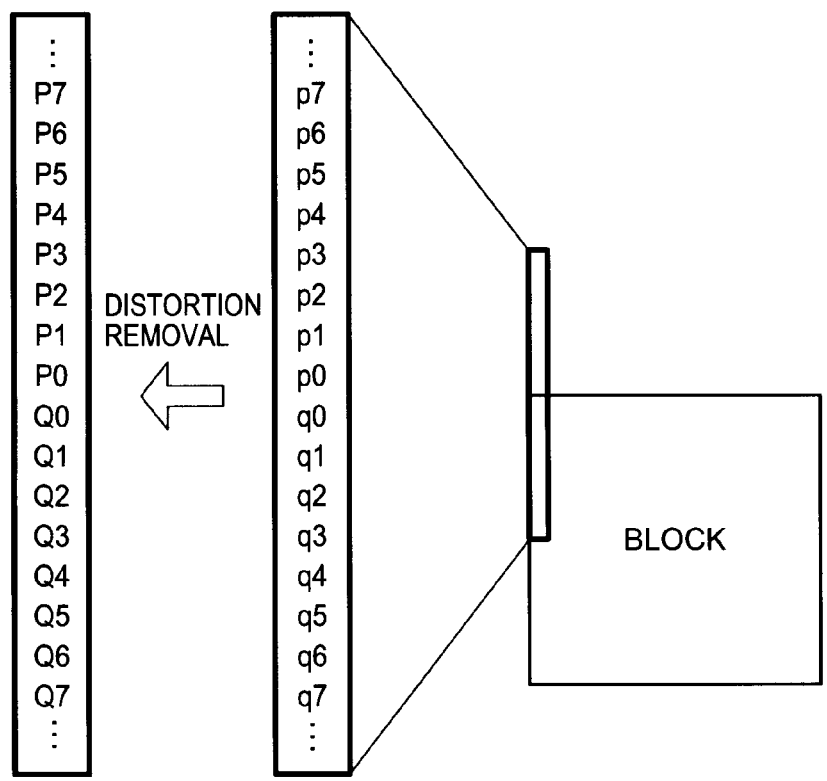
FIG. 9 is an explanatory diagram for describing application of vertical filtering of an adaptive distortion removal filter.

FIGS. 8 and 9 are explanatory diagrams for describing the operation of the adaptive distortion removal filter unit 108.

The adaptive distortion removal filter unit 108 applies filtering to a horizontal block boundary of a CU/PU/TU, as shown in FIG. 8. The adaptive distortion removal filter unit 108 also applies filtering to a vertical block boundary of the CU/PU/TU, as shown in FIG. 9. Since the CU/PU/TU is variable in block size as mentioned earlier, the block size is not designated in FIGS. 8 and 9. It is assumed here that a reference size of the pseudo random noise injection area is N (=8).

Regarding the filtering process for the horizontal block boundary shown in FIG. 8, pre-filtering pixels on the left side of the block boundary are denoted by p0, p1, p2, . . . from the block boundary, post-filtering pixels on the left side of the block boundary by P0, P1, P2, . . . , pre-filtering pixels on the right side of the block boundary by q0, q1, q2, q3, . . . from the block boundary, and post-filtering pixels on the right side of the block boundary by Q0, Q1, Q2, Q3, . . . .

Regarding the filtering process for the vertical block boundary shown in FIG. 9, pre-filtering pixels on the upper side of the block boundary are denoted by p0, p1, p2, . . . from the block boundary, post-filtering pixels on the upper side of the block boundary by P0, P1, P2, . . . , pre-filtering pixels on the lower side of the block boundary by q0, q1, q2, . . . , q3 from the block boundary, and post-filtering pixels on the lower side of the block boundary by Q0, Q1, Q2, Q3, . . . .

It is assumed that . . . , P3, P2, P1, P0, Q0, Q1, Q2, Q3, . . . are initialized respectively to . . . , p3, p2, p1, p0, q0, q1, q2, q3, . . . .

Figure 10:
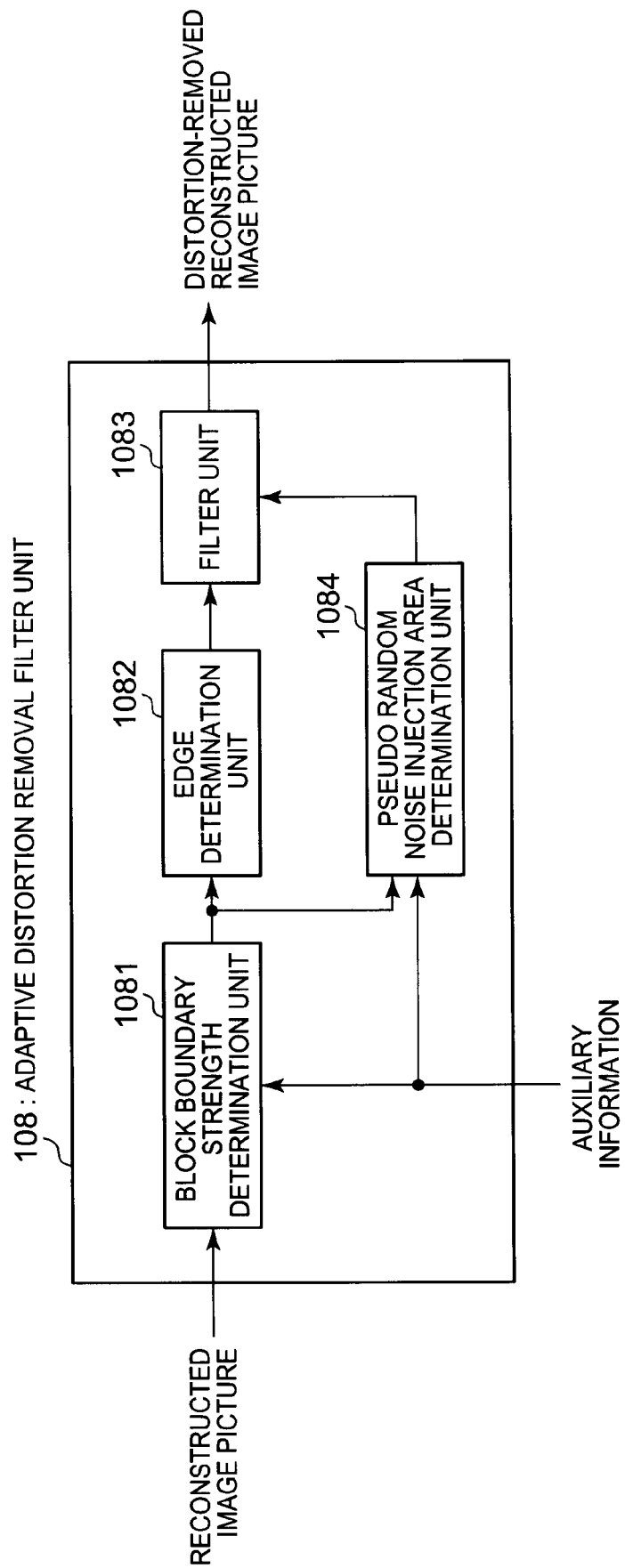
FIG. 10 is a block diagram showing a structure of an adaptive distortion removal filter.

The filtering process for the block boundary is the same between the horizontal direction and the vertical direction. Accordingly, the following description of the filtering process for the block boundary is made without particularly distinguishing between the horizontal direction and the vertical direction. FIG. 10 shows an internal structure of the adaptive distortion removal filter unit 108.

Figure 24:
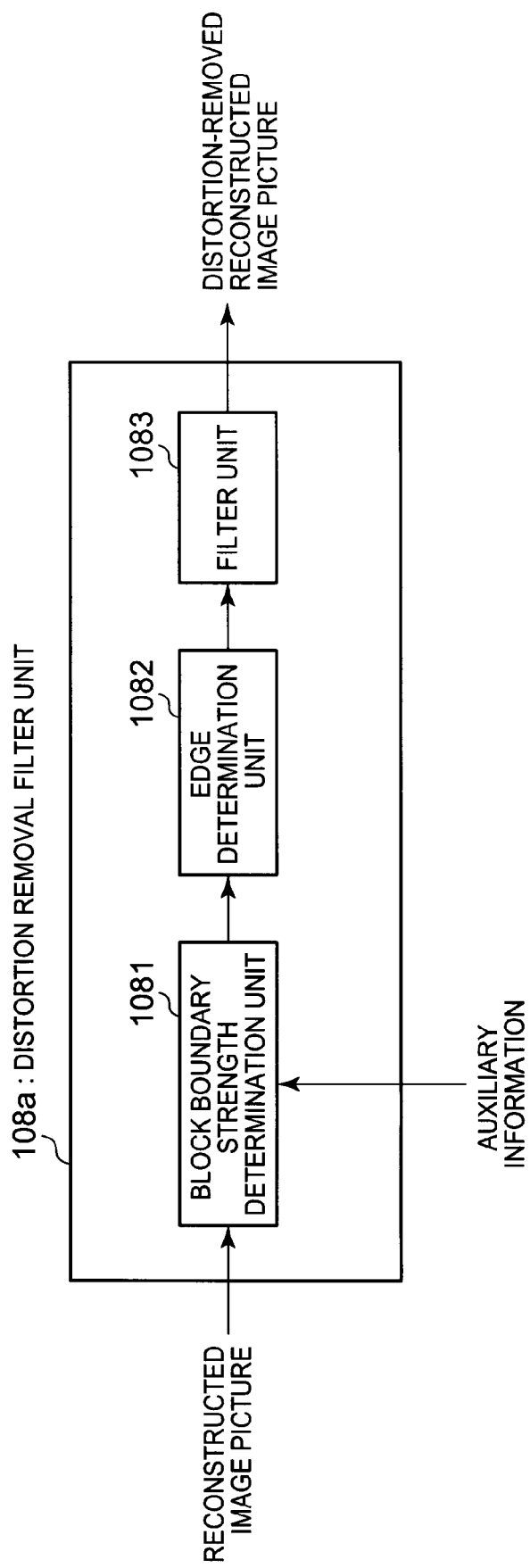
FIG. 24 is a block diagram showing a structure of a distortion removal filter.
Figure 25:
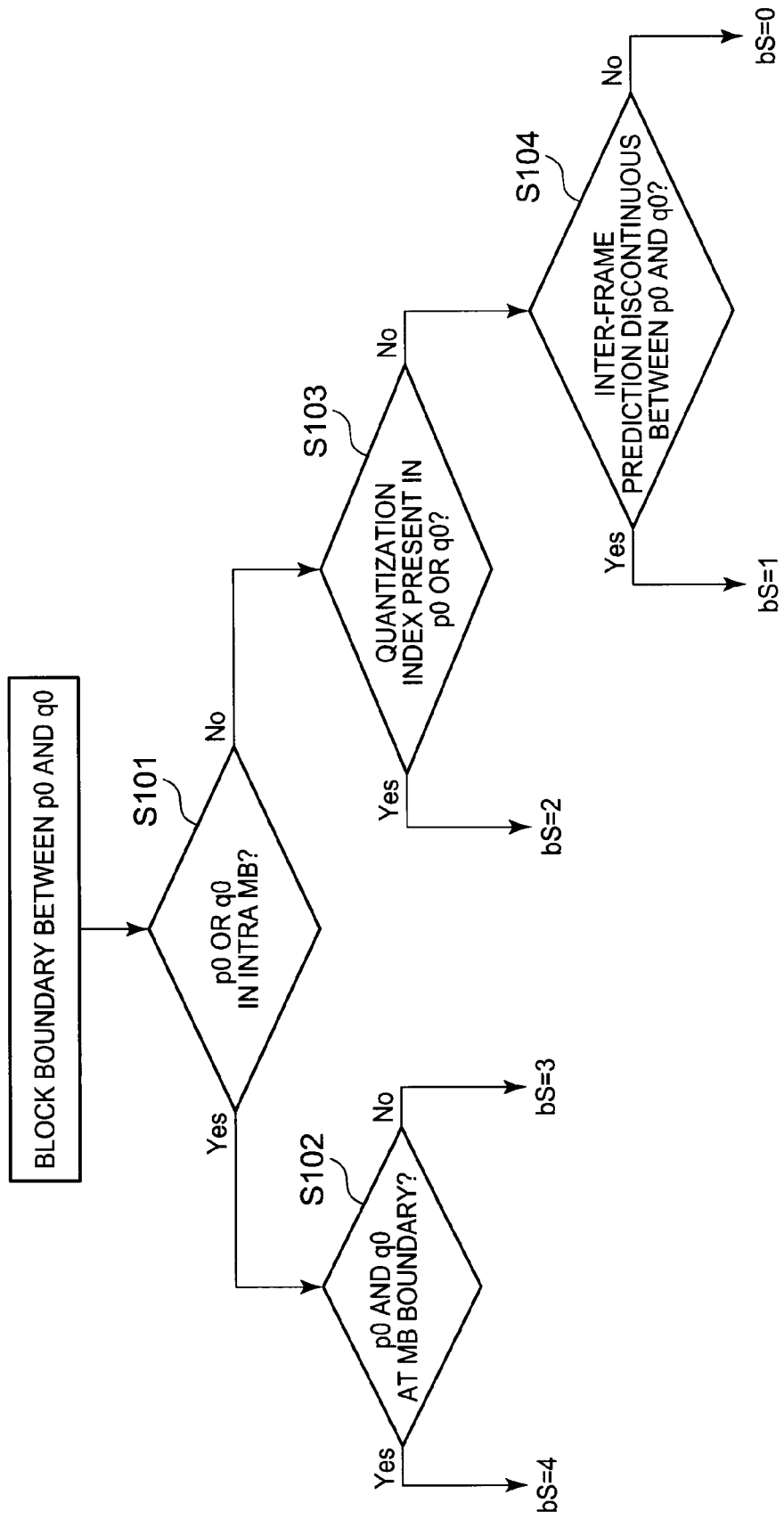
FIG. 25 is a flowchart showing a process of determining bS.
Figure 26:
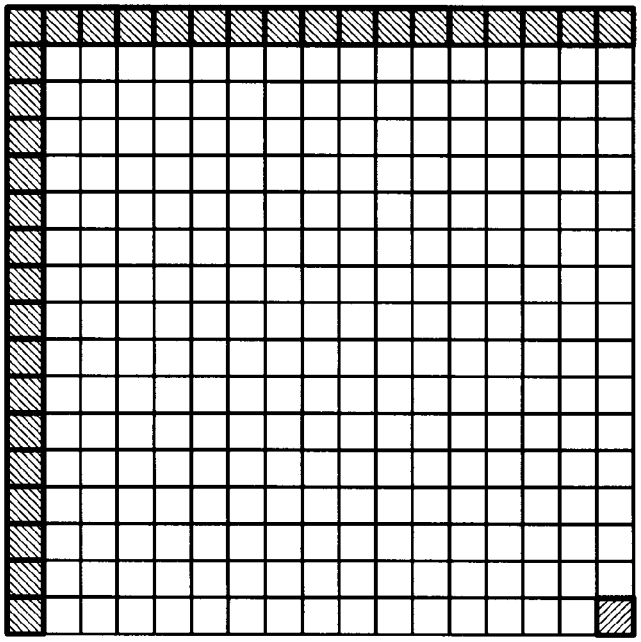
FIG. 26 is an explanatory diagram for describing planar prediction.
Figure 27:
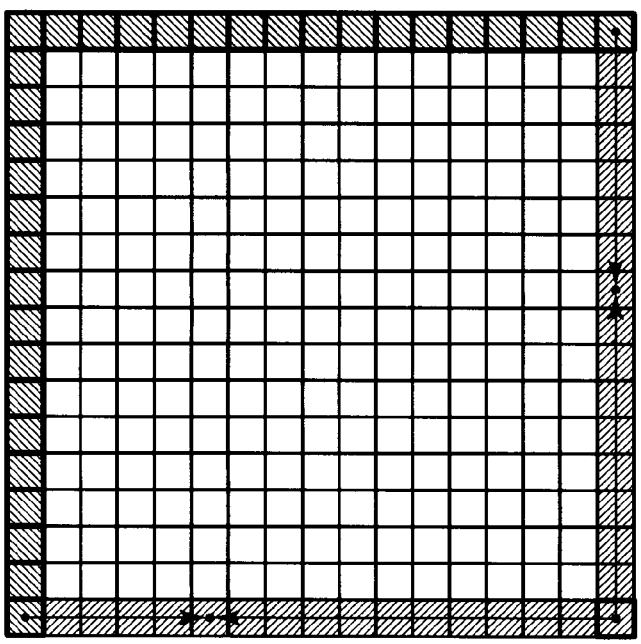
FIG. 27 is an explanatory diagram for describing planar prediction.
Figure 28:
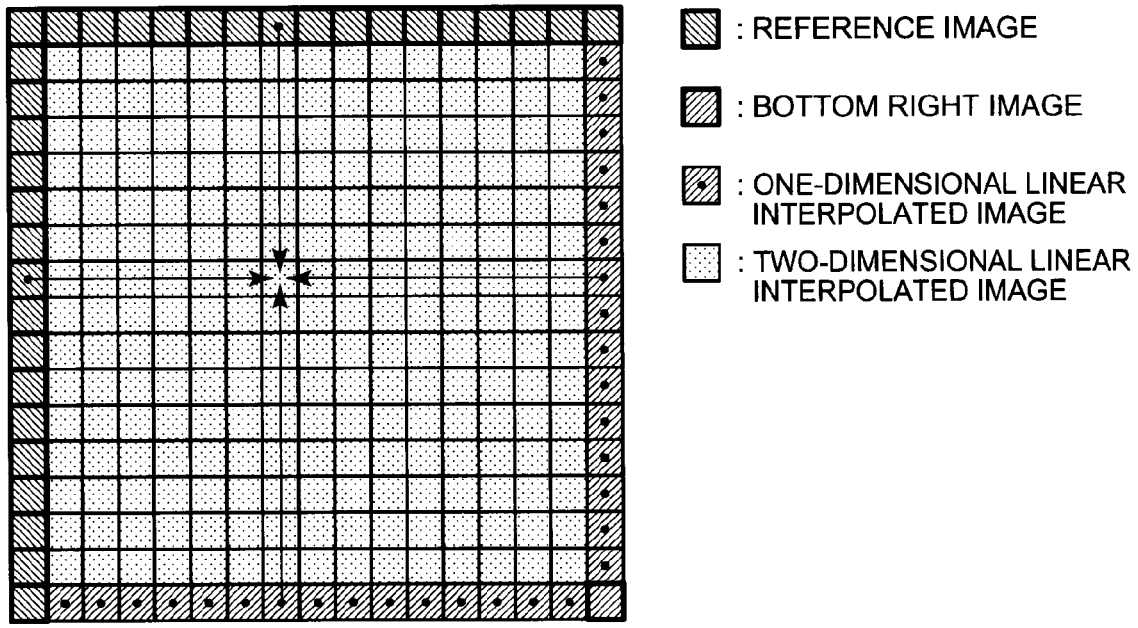
FIG. 28 is an explanatory diagram for describing planar prediction.
Figure 29:
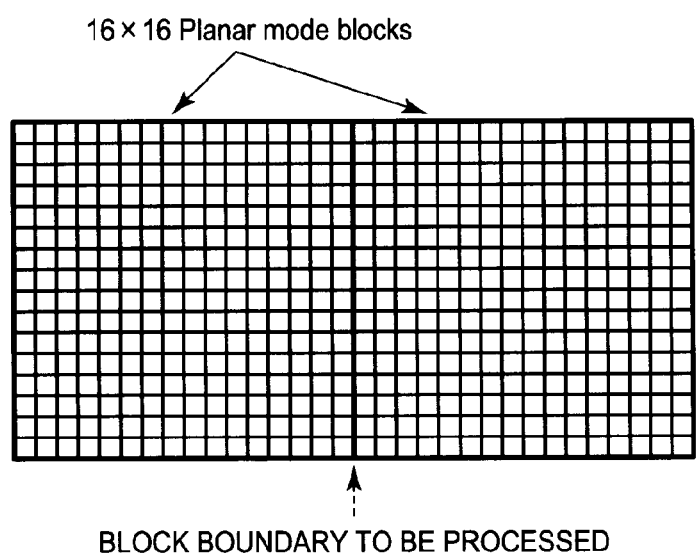
FIG. 29 is an explanatory diagram for describing planar mode filtering.
Figure 30:
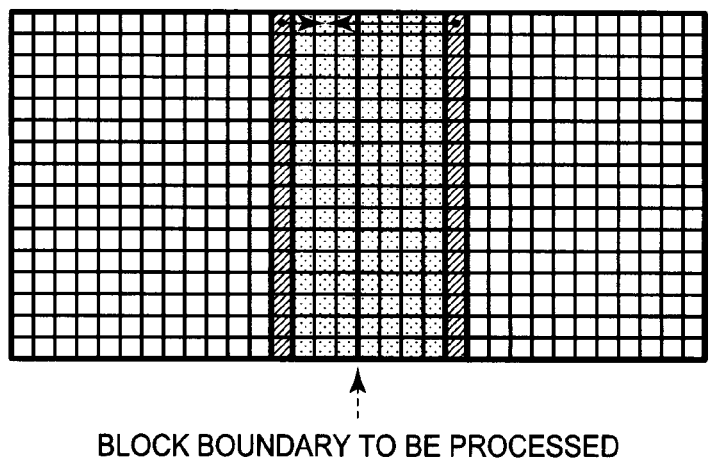
FIG. 30 is an explanatory diagram for describing planar mode filtering.

The block boundary strength determination unit 1081, the edge determination unit 1082, and the filter unit 1083 included in the adaptive distortion removal filter 108 shown in FIG. 10 are the same as those shown in FIG. 24. A pseudo random noise injection area determination unit 1084 is a functional block not included in the distortion removal filter 108a shown in FIG. 24. The pseudo random noise injection area determination unit 1084 calculates a pseudo random noise injection area (pseudo random noise injection range) asymmetrical about a block boundary, using a block boundary strength (bS) supplied from the block boundary strength determination unit 1081 and block auxiliary information supplied from outside. The calculated pseudo random noise injection range is supplied to the filter unit 1083.

The following describes operations of the block boundary strength determination unit 1081, the edge determination unit 1082, the pseudo random noise injection area determination unit 1084, and the filter unit 1083 in this order.

Figure 11:
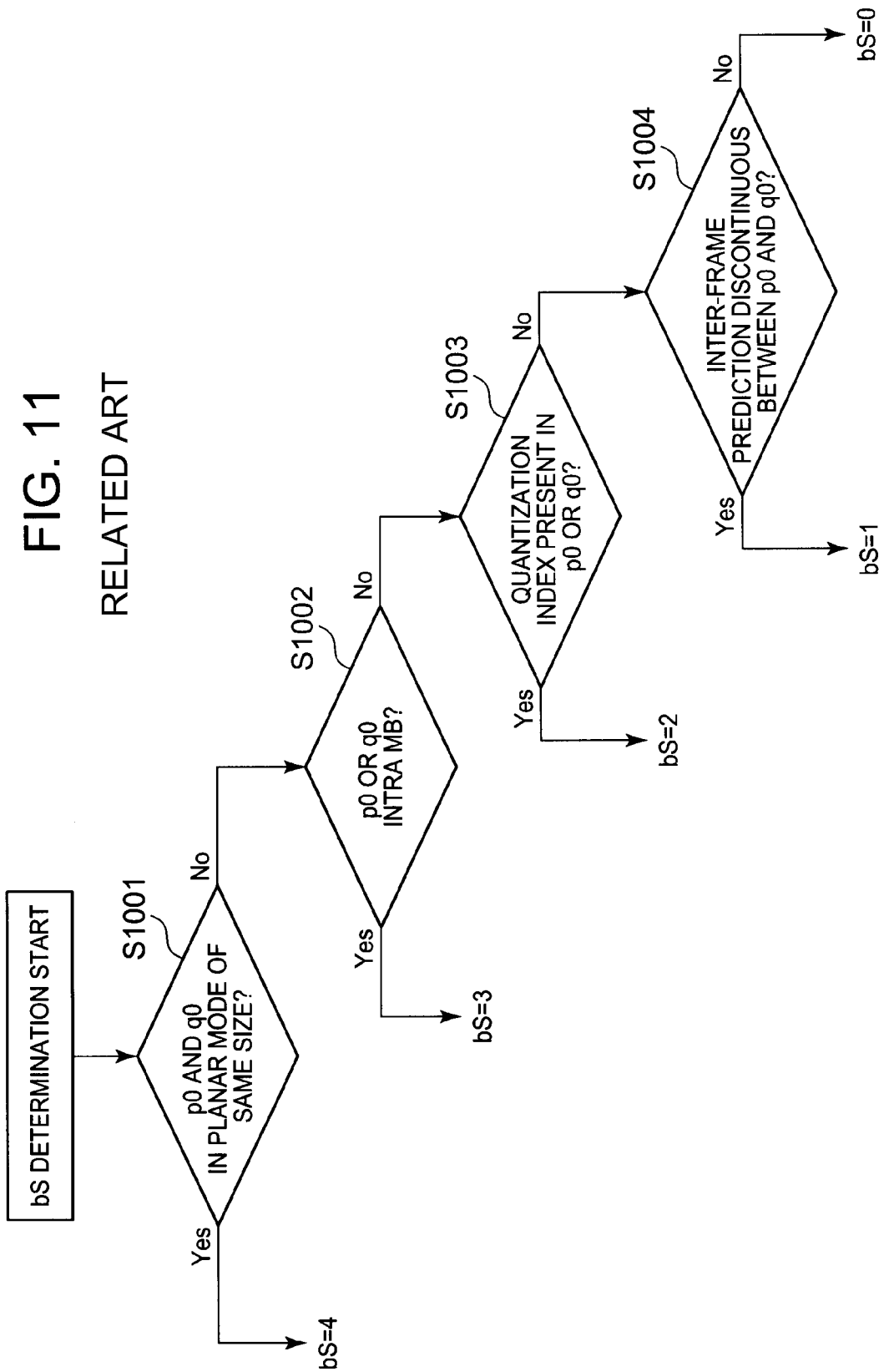
FIG. 11 is a flowchart showing an operation of a block boundary strength determination unit.

The block boundary strength determination unit 1081 determines the block boundary strength bS (0≤bS≤4), based on the block auxiliary information supplied from outside the adaptive distortion removal filter 108. FIG. 11 is a flowchart showing a process of determining bS.

In the case where the block boundary pixel p0 and the block boundary pixel q0 are in the planar mode of the same block size (step S1001), the block boundary strength determination unit 1081 determines bS as 4.

In the case where the block boundary pixel p0 and the block boundary pixel q0 are not in the planar mode of the same block size, the block boundary strength determination unit 1081 determines bS as 3 in the case where any of the block boundary pixel p0 and the block boundary pixel q0 is a pixel of an intra PU (step S1002).

In the case where none of the pixel p0 and the pixel q0 is the pixel of the intra PU, the block boundary strength determination unit 1081 determines whether or not a quantization index is present in any of blocks to which the pixel p0 and the pixel q0 respectively belong (step S1003). In the case where the quantization index is present in any of the blocks to which the pixel p0 and the pixel q0 respectively belong, the block boundary strength determination unit 1081 determines bS as 2.

In the case where the quantization index is not present in any of the blocks to which the pixel p0 and the pixel q0 respectively belong, the block boundary strength determination unit 1081 determines whether or not inter-frame prediction is discontinuous between the pixel p0 and the pixel q0 (step S1004). In the case where inter-frame prediction is discontinuous, the block boundary strength determination unit 1081 determines bS as 1. In the case where inter-frame prediction is not discontinuous, the block boundary strength determination unit 1081 determines bS as 0.

Figure 12:
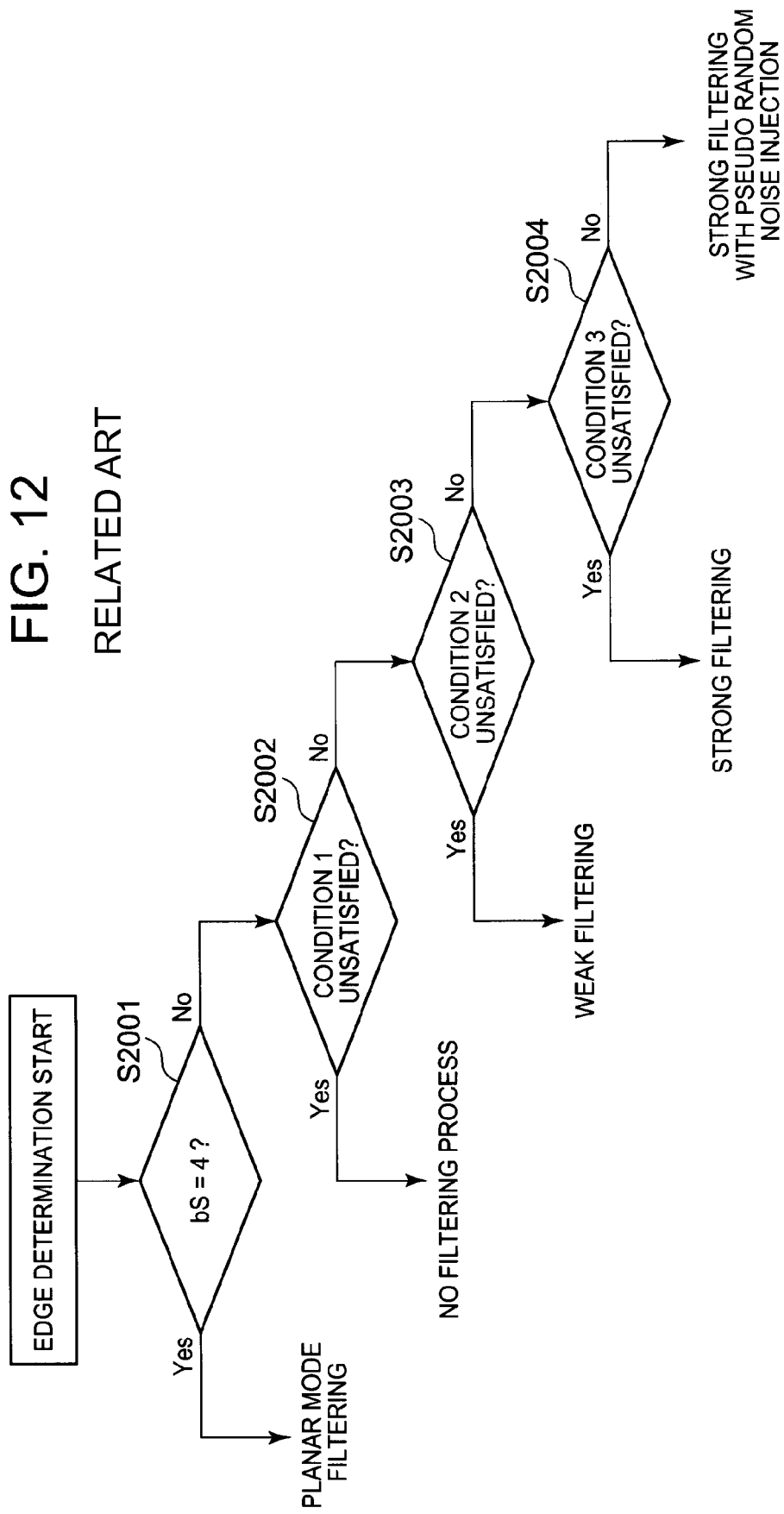
FIG. 12 is a flowchart showing an operation of an edge determination unit.

The edge determination unit 1082 determines a filtering process in the filter unit 1083, using bS supplied from the block boundary strength determination unit 1081 and a reconstructed image supplied from outside. FIG. 12 is a flowchart of this operation.

The edge determination unit 1082 determines, for each of eight edges corresponding to eight rows (horizontal block boundary) or eight columns (vertical block boundary) of the block boundary to be processed, whether or not the corresponding block boundary has bS=4 (step S2001). In the case where bS=4, the edge determination unit 1082 determines to perform planar mode filtering for the eight edges.

In the case where the corresponding block boundary does not have bS=4, the edge determination unit 1082 determines whether or not the following condition 1 is satisfied, for each of the above-mentioned eight edges (step S2002). In the case where the condition 1 is unsatisfied, the edge determination unit 1082 determines to perform no filtering process for the eight edges.

$$bS > 0;$$

and $$d = |p2_2 - 2*p1_2 + p0_2| + |q2_2 - 2*q1_2 + q0_2| + |p2_5 - 2*p1_5 + p0_5| + |q2_5 - 2*q1_5 + q0_5| < \beta.$$ Condition 1

In the condition 1, the numerical subscripts are indices of eight edges to be processed, as described in "Notation of an 8 pixels part of vertical edge for deblocking" in Section 5.4.1 Deblocking filter process in NPL 3. Meanwhile, β is a parameter dependent on a quantization parameter QP, as described in "Relation between qp, tc, and beta" in Section 5.4.1 Deblocking filter process in NPL 3.

In the case where the condition 1 is satisfied, the edge determination unit 1082 determines whether or not the following condition 2 is satisfied, for each edge i (0≤i≤7) of the eight edges (step S2003). In the case where the condition 2 is unsatisfied, the edge determination unit 1082 determines to apply weak filtering described later to the edge i.

$$d < (\beta/4);$$

$$(|p3_i - p0_i| + |q3_i - q0_i|) < (\beta/8); \text{ and}$$

$$(|p0_i - q0_i|) < ((5*tc+1)/2).$$ Condition 2

Here, tc is a parameter dependent on the quantization parameter QP, as described in "Relation between qp, tc, and beta" in Section 5.4.1 Deblocking filter process in NPL 3.

In the case where the condition 2 is satisfied, the edge determination unit 1082 determines whether or not the condition 3 is satisfied, for each edge i (0≤i≤7) (step S2004). In the case where the condition 3 is unsatisfied, the edge determination unit 1082 determines to apply strong filtering described later to the edge i. In the case where the condition 3 is satisfied, the edge determination unit 1082 determines to apply strong filtering with pseudo random injection described later to the edge i.

Figure 13:
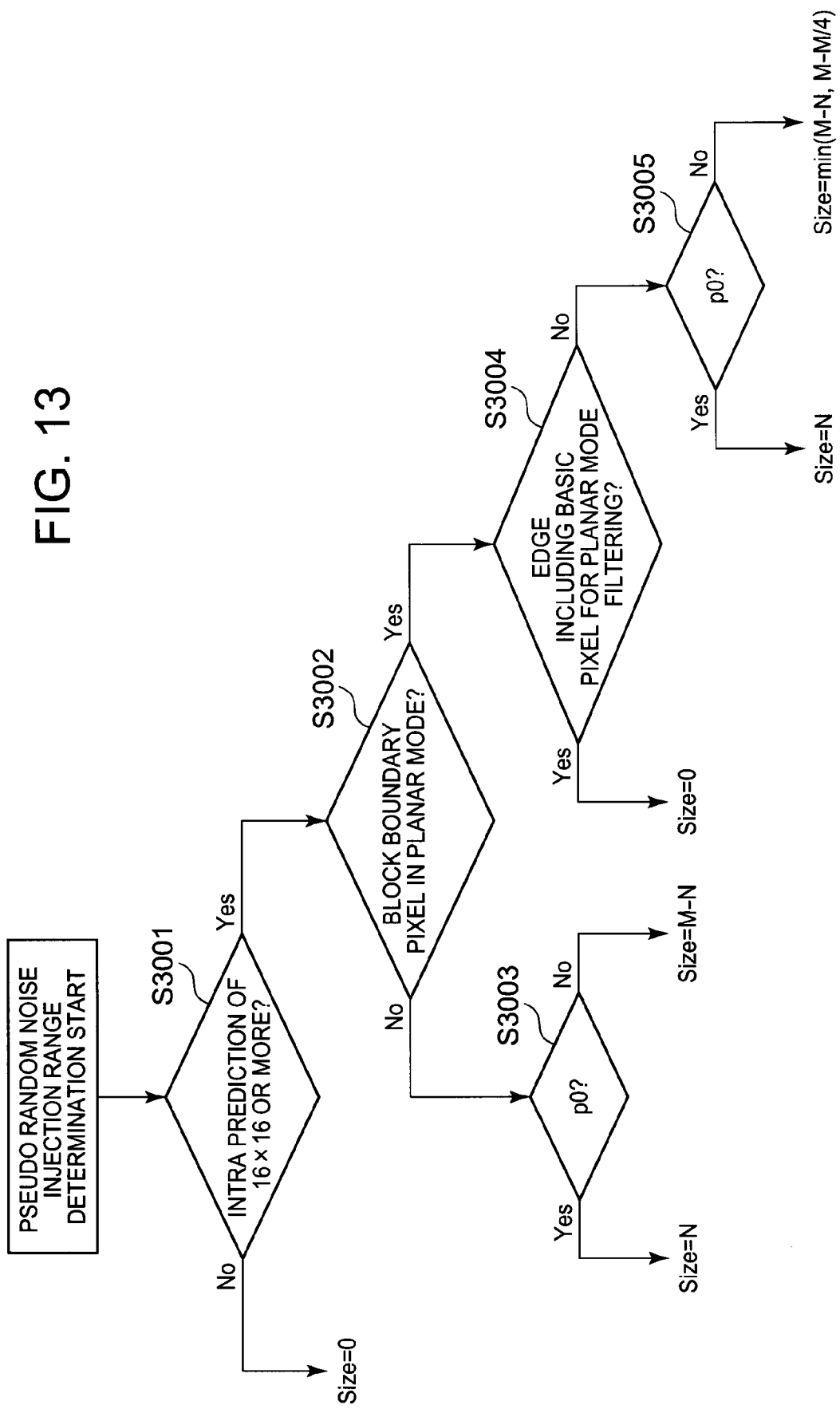
FIG. 13 is a flowchart showing an operation of a pseudo random noise injection area determination unit.

The pseudo random noise injection area determination unit 1084 calculates a size pSize of a pseudo random noise injection area on the block boundary pixel p0 side and a size qSize of a pseudo random noise injection area on the block boundary pixel q0 side, using the block boundary strength (bS) supplied from the block boundary strength determination unit 1081 and the block auxiliary information supplied from outside. FIG. 13 is a flowchart of this operation.

The pseudo random noise injection area determination unit 1084 determines, using the block auxiliary information of the block to which the input block boundary pixel belongs, whether or not the block is an intra prediction block of a predetermined size (16×16 in this exemplary embodiment) (step S3001). In the case where the block is not the intra prediction block of 16×16 or more, the pseudo random noise injection area determination unit 1084 determines the size of the pseudo random noise injection area as 0. The pseudo random noise injection area determination unit 1084 may not only determine the size of intra prediction but also determine, for example, whether or not the edge boundary and its peripheral pixel are flat as $|p0_i - q0_i| \le 1$ and $|q0_i - q7_i| \le 1$ are satisfied in the case where the block boundary pixel is q0 (whether or not the edge boundary and its peripheral pixel are flat as $|p0_i - q0_i| \le 1$ and $|p0_i - p7_i| \le 1$ are satisfied in the case where the block boundary pixel is p0), and determine the size of the pseudo random noise injection area as 0 in the case where the edge boundary and its peripheral pixel are not flat. Here, the pseudo random noise injection area determination unit 1084 may determine that the edge boundary and its peripheral pixel are flat, in the case where d calculated for the condition 1 in step S2002 is less than a predetermined threshold.

In the case where the block to which the input block boundary pixel belongs is the intra prediction block of 16×16 or more, the pseudo random noise injection area determination unit 1084 determines whether or not the input block boundary pixel belongs to a planar mode block (step S3002). In the case where the input block boundary pixel does not belong to the planar mode block, the pseudo random noise injection area determination unit 1084 advances to step S3003. In the case where the input block boundary pixel belongs to the planar mode block, the pseudo random noise injection area determination unit 1084 advances to step S3004.

In step S3003, the pseudo random noise injection area determination unit 1084 determines whether or not the input block boundary pixel is p0. In the case where the input block boundary pixel is p0, the pseudo random noise injection area determination unit 1084 determines the size of the pseudo random noise injection area as N(N=8). In the case where the input block boundary pixel is not p0, the pseudo random noise injection area determination unit 1084 determines the size of the pseudo random noise injection area as M−N, using the size M of one side of the M×M block (M=16, 32, 64) to which q0 belongs.

In step S3004, the pseudo random noise injection area determination unit 1084 determines whether or not the edge i is a row or a column including a reference image for planar mode filtering of subsequent horizontal and vertical block boundaries. In the case where the edge i is the row or the column including the reference image for planar mode filtering of subsequent horizontal and vertical block boundaries, the pseudo random noise injection area determination unit 1084 determines the size of the pseudo random noise injection area as 0 so that pseudo random noise is not injected to the reference image for planar mode filtering of subsequent horizontal and vertical block boundaries. In the case where the edge i does not include the reference image for planar mode filtering of subsequent horizontal and vertical block boundaries, the pseudo random noise injection area determination unit 1084 advances to step S3005.

In step S3005, the pseudo random noise injection area determination unit 1084 determines whether or not the input block boundary pixel is p0. In the case where the input block boundary pixel is p0, the pseudo random noise injection area determination unit 1084 determines the size of the pseudo random noise injection area as N(N=8). In the case where the input block boundary pixel is not p0, the pseudo random noise injection area determination unit 1084 determines the size of the pseudo random noise injection area as min(M−N, M−M/4), using the size M of one side of the M×M block (M=16, 32, 64) to which q0 belongs. The second variable of min(M−N, M−M/4) is intended to, in the case where the block to be processed is in the planar mode, use the planar mode block size to limit the pseudo random noise injection range so that pseudo random noise is not injected to the reference image for planar mode filtering of subsequent horizontal and vertical block boundaries.

The filter unit 1083 applies the filtering process determined by the edge determination unit 1082, to each edge (0≤i≤7). The following describes each of the planar mode filtering, the weak filtering, the strong filtering, and the strong filtering with pseudo random injection.

In the case of applying the planar mode filtering, $Pk_i$ (0≤k≤M/4−1) and $Qk_i$ (0≤k≤M/4) are calculated according to Planar mode filtering in Section 5.4.1 Deblocking filter process in NPL 3.

In the case of applying the weak filtering, pixels $P0_i$ and $Q0_i$ of the edge i are calculated by the following equations.

$$P0_i = \text{Clip}_{0-255}(p0_i + \text{Clip}(-tc,tc,(13*(q0_i-p0_i)+4*(q1_i-p1_i)-5*(q2_i-p2_i)+16)/32)) \quad (9)$$

$$Q0_i = \text{Clip}_{0-255}(q0_i - \text{Clip}(-tc,tc,(13*(q0_i-p0_i)+4*(q1_i-p1_i)-5*(q2_i-p2_i)+16)/32)) \quad (10)$$

In the case of applying the strong filtering, pixels $P2_i$, $P1_i$, $P0_i$, $Q0_i$, $Q1_i$, and $Q2_i$ of the edge i are calculated by the following equations.

$$P0_i = \text{Clip}_{0-255}((p2_i+2*p1_i+2*p0_i+2*q0_i+q1_i+4)/8) \quad (11)$$

$$P1_i = \text{Clip}_{0-255}((p2_i+p1_i+p0_i+q0_i+2)/4) \quad (12)$$

$$P2_i = \text{Clip}_{0-255}((2*p3_i+3*p2_i+p1_i+p0_i+q0_i+4)/8) \quad (13)$$

$$Q0_i = \text{Clip}_{0-255}((q2_i+2*q1_i+2*q0_i+2*p0_i+p1_i+4)/8) \quad (14)$$

$$Q1_i = \text{Clip}_{0-255}((q2_i+q1_i+q0_i+p0_i+2)/4) \quad (15)$$

$$Q2_i = \text{Clip}_{0-255}((2*q3_i+3*q2_i+q1_i+q0_i+p0_i+4)/8) \quad (16)$$

In the case of applying the strong filtering with pseudo random injection, the above-mentioned strong filtering result $Pk_i$ (0≤k≤pSize) is calculated by the following equation, using pSize calculated by the pseudo random noise injection area determination unit 1084.

$$Pk_i = \text{Clip}_{0-255}(pk_i + nk_i)(0 \le k \le p\text{Size}) \quad (17)$$

Here, $nk_i = \text{LUT}[(\text{idxOffset}_i - k - 1) \ \& \ (\text{LUTSize}-1)]$. LUT[ ] is a look-up table which stores pseudo random noise and whose element takes any of the values −1, 0, and 1. LUTSize is a size of the look-up table. An offset $\text{idxOffset}_i$ of the look-up table is calculated by the following equation, depending on an adaptive distortion removal direction.

[Math. 1]

$$\text{idxOffset}_i = \begin{cases} PUPosX \ \&(LUTSize-1) + PITCH*1 & \cdots \text{ in the case of verical direction} \\ PUPosY \ \&(LUTSize-1) + PITCH*1 & \cdots \text{ in the case of horizontal direction} \end{cases} \quad (18)$$

Here, PUPosX is a horizontal position of a vertical edge shown in FIG. 8 in the frame, PUPosY is a vertical position of a horizontal edge shown in FIG. 9 in the frame, and PITCH is a predetermined value (e.g. 16).

Likewise, in the case of applying the strong filtering with pseudo random injection, a pixel $Qk_i$ (0≤k≤qSize) of the edge i, that is. the above-mentioned strong filtering result $Qk_i$ (0≤k≤qSize), is calculated by the following equation, using qSize calculated by the pseudo random noise injection area determination unit 1084.

$$Qk_i = \text{Clip}_{0-255}(qk_i + nk_i)(0 \le k \le q\text{Size}) \quad (19)$$

Here, $nk_i = \text{LUT}[(\text{idxOffset}_i + k) \ \& \ (\text{LUTSize}-1)]$.

This completes the description of the structure and the operation of the adaptive distortion removal filter 108 which is a feature of the present invention.

The video encoding device in this exemplary embodiment detects an area including a reference image for planar mode filtering based on block auxiliary information and a distortion removal edge position, and thereby prevents injection of pseudo random noise to the reference image for planar mode filtering. Thus, the video encoding device capable of suppressing linear artifacts while suppressing banding distortions can be provided.

Exemplary Embodiment 2

This exemplary embodiment describes a video decoding device using an adaptive distortion removal filter for detecting an area to which pseudo random noise is not injected in distortion removal of a block boundary based on block auxiliary information and a distortion removal edge position, and adaptively injecting pseudo random noise. The video decoding device in this exemplary embodiment is a video decoding device corresponding to the video encoding device in Exemplary Embodiment 1.

Figure 14:
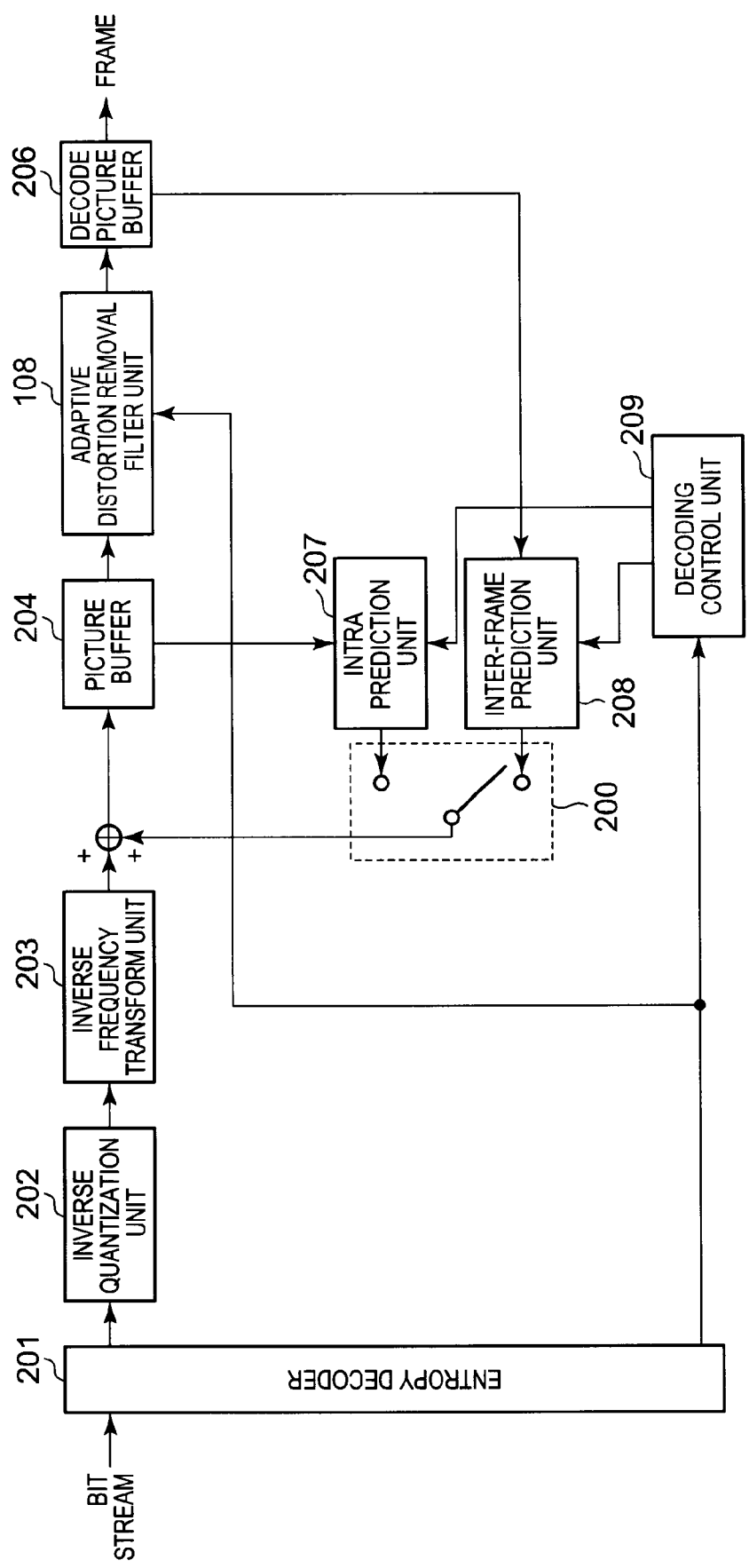
FIG. 14 is a block diagram showing a structure of a video decoding device in Exemplary Embodiment 2.

As shown in FIG. 14, the video decoding device in this exemplary embodiment includes an entropy decoder 201, an inverse quantization unit 202, an inverse frequency transform unit 203, a picture buffer 204, the adaptive distortion removal filter 108, a decode picture buffer 206, an intra prediction unit 207, an inter-frame prediction unit 208, a decoding control unit 209, and a switch 200.

The entropy decoder 201 entropy-decodes a bitstream, and outputs information about a prediction signal of a CU to be decoded, an integer DCT basis size, and a quantization index.

The intra prediction unit 207 creates an intra prediction signal, using a reconstructed image that is stored in the picture buffer 204 and has the same display time as a currently decoded frame.

The inter-frame prediction unit 208 creates an inter-frame prediction signal, using a reference image that is stored in the decode picture buffer 206 and has a different display time from the currently decoded frame.

The decoding control unit 209 controls the switch 200 to supply the intra prediction signal or the inter-frame prediction signal, based on entropy-decoded inter-frame prediction signal.

The inverse quantization unit 202 inverse-quantizes the quantization index supplied from the entropy decoder 201.

The inverse frequency transform unit 203 inverse-frequency-transforms a quantization representative value to return it to the original spatial domain, as with the inverse frequency transform unit 106 in Exemplary Embodiment 1.

The picture buffer 204 stores a reconstructed image block obtained by adding a prediction signal to a reconstructed prediction error image block returned to the original spatial domain, until all CUs included in the currently decoded frame are decoded.

The adaptive distortion removal filter 108 removes distortions for the reconstructed image stored in the picture buffer 204, after all CUs included in the current frame are decoded. The adaptive distortion removal filter 108 has the structure as shown in FIG. 10, and executes the processes as shown in FIGS. 11 to 13.

The decode picture buffer 206 stores the reconstructed image supplied from the adaptive distortion removal filter 108, from which distortions have been removed, as a reference image picture. An image of the reference image picture is used as a reference image for creating the inter-frame prediction signal. The reference image picture is also output as a decompressed frame at an appropriate display timing.

The video decoding device in this exemplary embodiment decompresses the bitstream through the processing described above.

The video decoding device in this exemplary embodiment detects an area including a reference image for planar mode filtering based on block auxiliary information and a distortion removal edge position, and thereby prevents injection of pseudo random noise to the reference image for planar mode filtering. Thus, the video decoding device capable of suppressing linear artifacts while suppressing banding distortions can be provided.

Each of the exemplary embodiments described above may be realized by hardware, or may be realized by a computer program.

Figure 15:
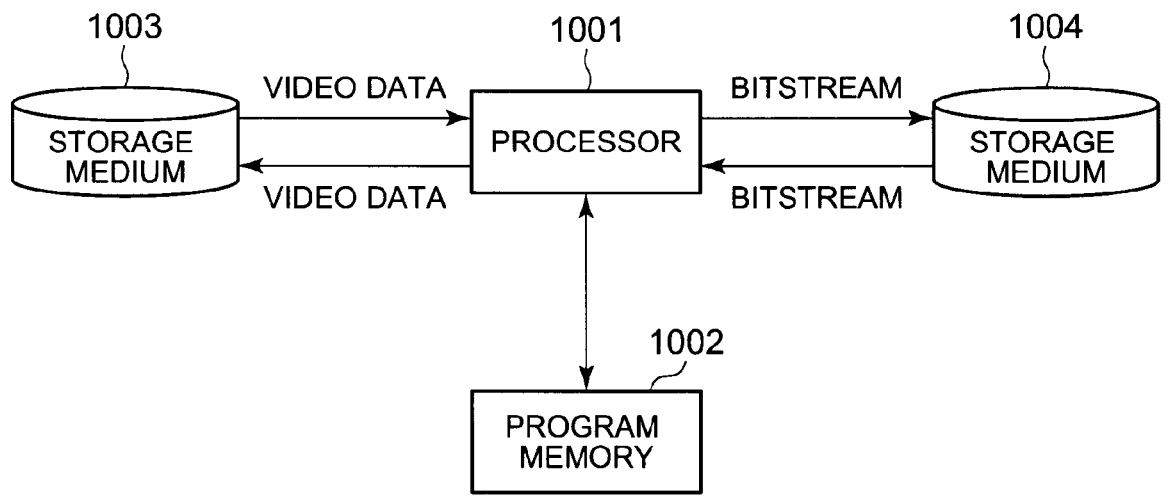
FIG. 15 is a block diagram showing an example of a structure of an information processing system capable of realizing functions of a video encoding device and a video decoding device according to the present invention.

An information processing system shown in FIG. 15 includes a processor 1001, a program memory 1002, a storage medium 1003, and a storage medium 1004. The storage medium 1003 and the storage medium 1004 may be separate storage media, or may be storage areas included in the same storage medium. As a storage medium, a magnetic storage medium such as a hard disk is applicable.

In the information processing system shown in FIG. 15, a program for realizing the functions of the blocks (except the buffer blocks) shown in each of FIGS. 7, 10, and 14 is stored in the program memory 1002. The processor 1001 realizes the functions of the video encoding device or the video decoding device shown in FIG. 7, 10, or 14, by executing processing according to the program stored in the program memory 1002.

Figure 16:
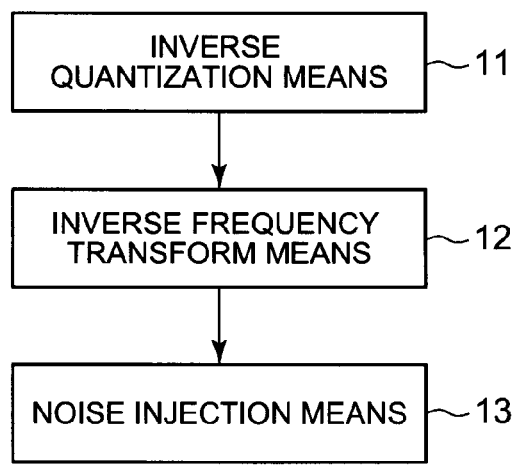
FIG. 16 is a block diagram showing main parts of a video encoding device according to the present invention.

FIG. 16 is a block diagram showing main parts of a video encoding device according to the present invention. As shown in FIG. 16, the video encoding device according to the present invention includes: inverse quantization means 11 (e.g. the inverse quantization unit 105) for inverse-quantizing a quantization index to obtain a quantization representative value; inverse frequency transform means 12 (e.g. the inverse frequency transform unit 106) for inverse-transforming the quantization representative value obtained by the inverse quantization means 11, to obtain a reconstructed image block; and noise injection means 13 (e.g. the adaptive distortion removal filter unit 108) for injecting pseudo random noise to an area centered on a boundary of the reconstructed image block, wherein the noise injection means 13 does not inject pseudo random noise to an area including a reference image for planar mode filtering.

Figure 17:
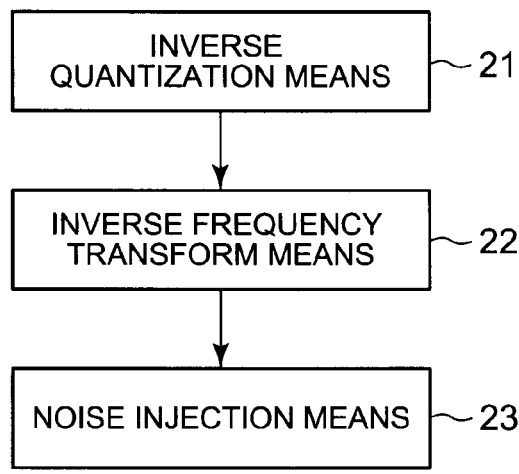
FIG. 17 is a block diagram showing main parts of a video decoding device according to the present invention.

FIG. 17 is a block diagram showing main parts of a video decoding device according to the present invention. As shown in FIG. 17, the video decoding device according to the present invention includes: inverse quantization means 21 (e.g. the inverse quantization unit 202) for inverse-quantizing a quantization index to obtain a quantization representative value; inverse frequency transform means 22 (e.g. the inverse frequency transform unit 203) for inverse-transforming the quantization representative value obtained by the inverse quantization means 21, to obtain a reconstructed image block; and noise injection means 23 (e.g. the adaptive distortion removal filter unit 108) for injecting pseudo random noise to an area centered on a boundary of the reconstructed image block, wherein the noise injection means 13 does not inject pseudo random noise to an area including a reference image for planar mode filtering.

Figure 18:
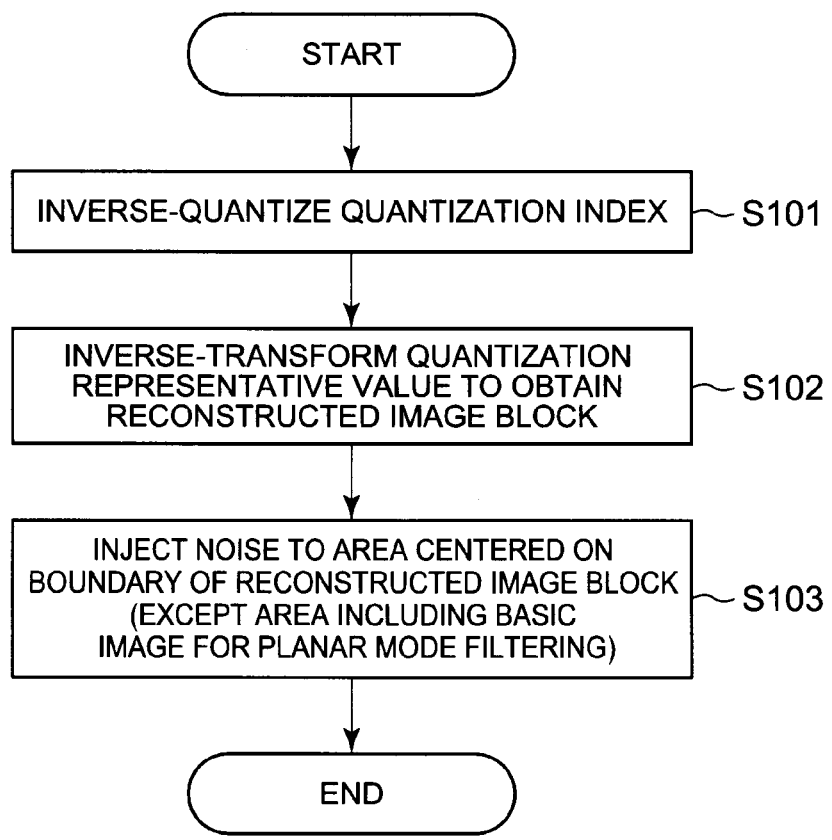
FIG. 18 is a flowchart showing a process of a video encoding device according to the present invention.

FIG. 18 is a flowchart showing main steps of a video encoding method according to the present invention. As shown in FIG. 18, the video encoding method according to the present invention includes: inverse-quantizing a quantization index to obtain a quantization representative value (step S101); inverse-transforming the obtained quantization representative value to obtain a reconstructed image block (step S102); and injecting pseudo random noise to an area centered on a boundary of the reconstructed image block (step S103), wherein, in the process of injecting pseudo random noise, pseudo random noise is not injected to an area including a reference image for planar mode filtering.

Figure 19:
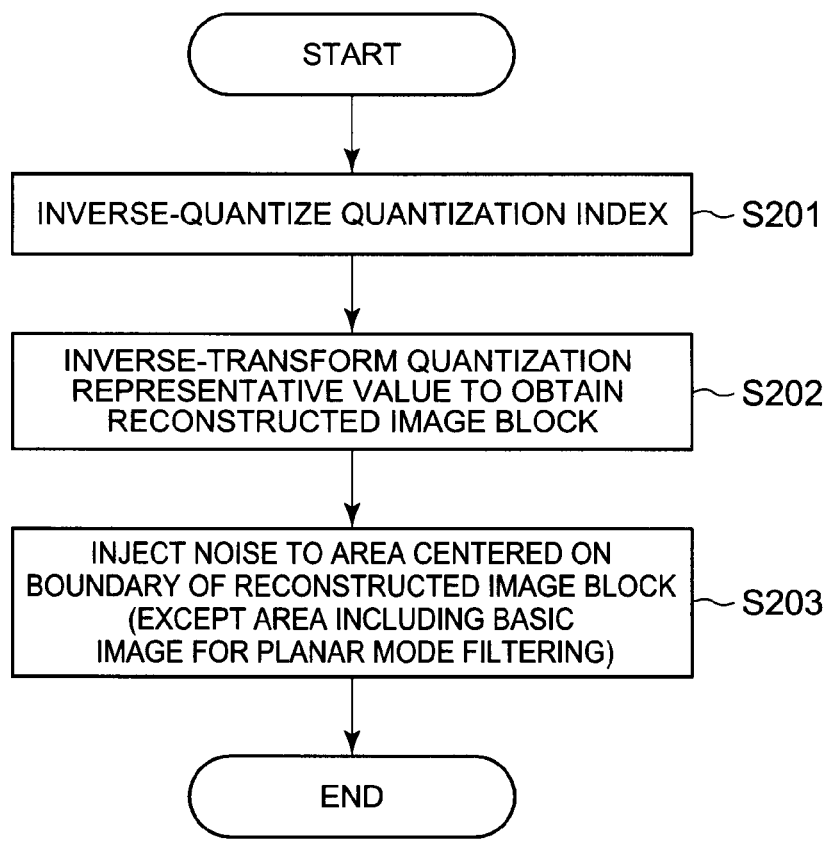
FIG. 19 is a flowchart showing a process of a video decoding device according to the present invention.

FIG. 19 is a flowchart showing main steps of a video decoding method according to the present invention. As shown in FIG. 19, the video decoding method according to the present invention includes: inverse-quantizing a quantization index to obtain a quantization representative value (step S201); inverse-transforming the obtained quantization representative value to obtain a reconstructed image block (step S202); and injecting pseudo random noise to an area centered on a boundary of the reconstructed image block (step S203), wherein, in the process of injecting pseudo random noise, pseudo random noise is not injected to an area including a reference image for planar mode filtering.

Though the present invention has been described with reference to the above exemplary embodiments and examples, the present invention is not limited to the above exemplary embodiments and examples. Various changes understandable by those skilled in the art within the scope of the present invention can be made to the structures and details of the present invention.

This application claims priority based on Japanese Patent Application No. 2010-208892 filed on Sep. 17, 2010, the disclosure of which is incorporated herein in its entirety.

REFERENCE SIGNS LIST 11 inverse quantization means
12 inverse frequency transform means
13 noise injection means
21 inverse quantization means
22 inverse frequency transform means
23 noise injection means
100 switch
101 MB buffer
102 frequency transform unit
103 quantization unit
104 entropy encoder
105 inverse quantization unit
106 inverse frequency transform unit
107 picture buffer
108 adaptive distortion removal filter unit
108a distortion removal filter unit
1081 block boundary strength determination unit
1082 edge determination unit
1083 filter unit
1084 pseudo random noise injection area determination unit
109 decode picture buffer
110 intra prediction unit
111 inter-frame prediction unit
112 encoding control unit
200 switch
201 entropy decoder
202 inverse quantization unit
203 inverse frequency transform unit
204 picture buffer
206 decode picture buffer
207 intra prediction unit
208 inter-frame prediction unit
209 decoding control unit
1001 processor
1002 program memory
1003 storage medium
1004 storage medium

The invention claimed is:

1. A video encoding device comprising:
an inverse quantization unit which inverse-quantizes a quantization index to obtain a quantization representative value;
an inverse frequency transform unit which inverse-transforms the quantization representative value obtained by the inverse quantization unit, to obtain a reconstructed image block; and
a noise injection unit which injects pseudo random noise to a noise injection area when planar mode filtering occurs and wherein the noise injection area is centered on a boundary of the reconstructed image block and excludes a basic image area.

2. A video decoding device comprising:
an inverse quantization unit which inverse-quantizes a quantization index to obtain a quantization representative value;
an inverse frequency transform unit which inverse-transforms the quantization representative value obtained by the inverse quantization unit, to obtain a reconstructed image block; and
a noise injection unit which injects pseudo random noise to a noise injection area when planar mode filtering occurs and wherein the noise injection area is centered on a boundary of the reconstructed image block and excludes a basic image area.

3. A video encoding method comprising:
inverse-quantizing a quantization index to obtain a quantization representative value;
inverse-transforming the obtained quantization representative value to obtain a reconstructed image block; and
injecting pseudo random noise to a noise injection area when planar mode filtering occurs, wherein the noise injection area is centered on a boundary of the reconstructed image block and excludes a basic image area.

4. A video decoding method comprising:
inverse-quantizing a quantization index to obtain a quantization representative value;
inverse-transforming the obtained quantization representative value to obtain a reconstructed image block; and
injecting pseudo random noise to a noise injection area when planar mode filtering occurs, wherein the noise injection area is centered on a boundary of the reconstructed image block and excludes a basic image area.

5. A non-transitory computer readable information recording medium storing a video encoding program, when executed by a processor:
inverse-quantizing a quantization index to obtain a quantization representative value;
inverse-transforming the obtained quantization representative value to obtain a reconstructed image block; and
injecting pseudo random noise to a noise injection area when planar mode filtering occurs, wherein the noise injection area is centered on a boundary of the reconstructed image block and excludes a basic image area.

6. A non-transitory computer readable information recording medium storing a video decoding program, when executed by a processor:
inverse-quantizing a quantization index to obtain a quantization representative value;
inverse-transforming the obtained quantization representative value to obtain a reconstructed image block; and
injecting pseudo random noise to a noise injection area when planar mode filtering occurs, wherein the noise injection area is centered on a boundary of the reconstructed image block and excludes a basic image area.

* * * * *